United States Patent [19]
Aoki et al.

[11] Patent Number: 5,963,602
[45] Date of Patent: Oct. 5, 1999

[54] SYNCHRONISM DETECTION AND DEMODULATING CIRCUIT

[75] Inventors: Kazuya Aoki, Chiba; Ichiro Konno, Narashino; Koichi Kawaguchi, Chiba, all of Japan

[73] Assignee: Sharp Kabushiki Kaisha, Osaka, Japan

[21] Appl. No.: 08/795,318

[22] Filed: Feb. 3, 1997

[30] Foreign Application Priority Data

Feb. 29, 1996 [JP] Japan .................................. 8-042713

[51] Int. Cl.[6] .................................................. G11B 20/00
[52] U.S. Cl. ........................ 375/354; 375/226; 375/372; 370/506; 371/37.7; 371/42; 371/47.7
[58] Field of Search ................................ 375/226, 354, 375/366, 368, 372; 370/505, 506, 509–514; 371/42, 47.1, 37.7

[56] References Cited

U.S. PATENT DOCUMENTS

| 4,316,284 | 2/1982 | Howson | 370/512 |
|---|---|---|---|
| 4,344,180 | 8/1982 | Cummiskey | 375/368 |
| 4,674,088 | 6/1987 | Grover | 370/506 |
| 4,680,763 | 7/1987 | Suma et al. | 371/37.7 |
| 4,748,623 | 5/1988 | Fujimoto | 370/513 |
| 5,040,195 | 8/1991 | Kosaka et al. | 375/365 |
| 5,060,239 | 10/1991 | Briscoe et al. | 375/260 |
| 5,313,500 | 5/1994 | Rikiyama | 375/365 |
| 5,394,410 | 2/1995 | Chen | 371/70 |
| 5,710,774 | 1/1998 | Suh et al. | 370/513 |
| 5,715,259 | 2/1998 | Lee et al. | 371/42 |

FOREIGN PATENT DOCUMENTS 7-57396   3/1995   Japan .

*Primary Examiner*—Young T. Tse
*Attorney, Agent, or Firm*—Nixon & Vanderhye, P.C.

[57] ABSTRACT

A synchronism detection and demodulating circuit includes: a circuit for frequency dividing the regenerative clock in an irregular manner, a circuit for reading out the input data in a special manner based on the clock and producing data that provides information about the readout data, and a circuit for deleting unnecessary data from the readout data based on the data providing the information.

13 Claims, 22 Drawing Sheets

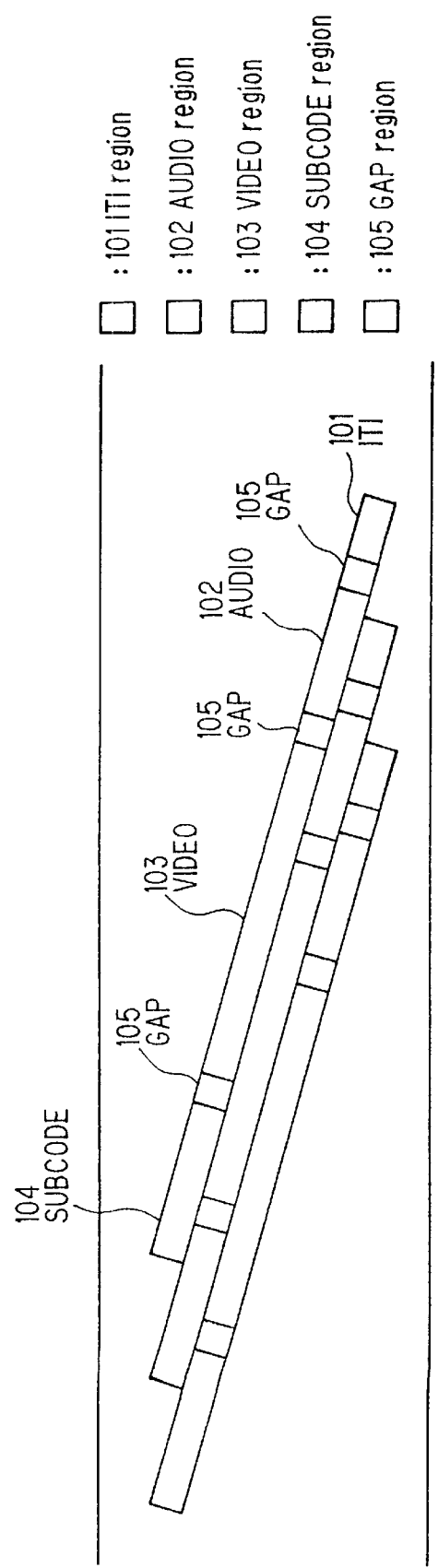

Fig. 2 PRIOR ART
(A) AUDIO region 
(B) VIDEO region 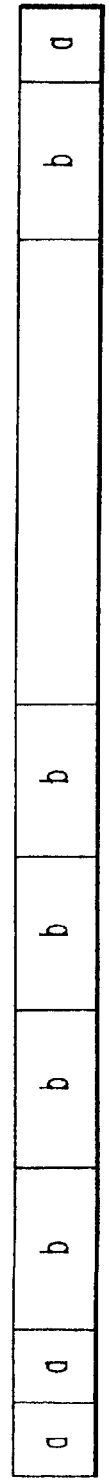
(C) SUBCODE region 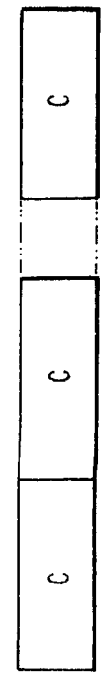
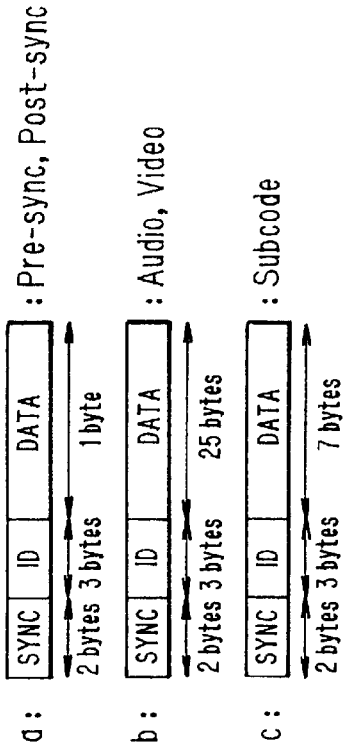
a : Pre-sync, Post-sync
b : Audio, Video
c : Subcode (1) Bit pattern before the 24/25 modulation (2) Bit pattern after the 24/25 modulation

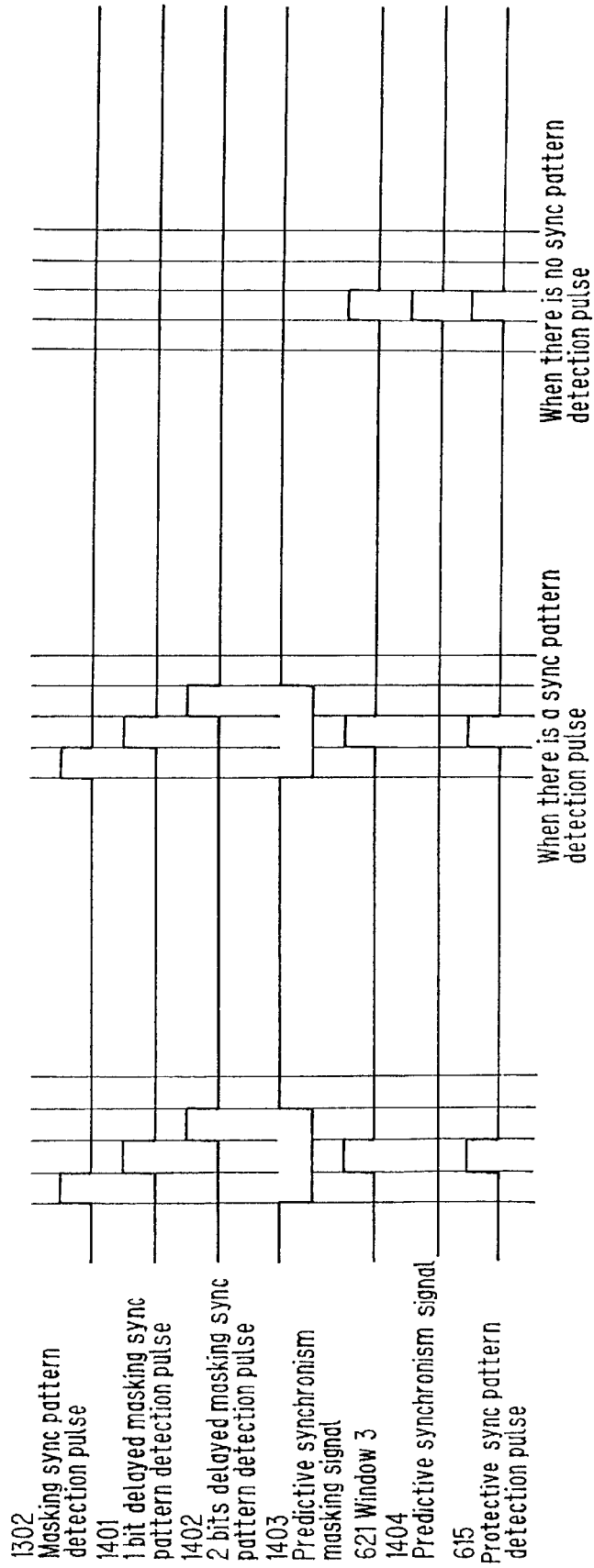

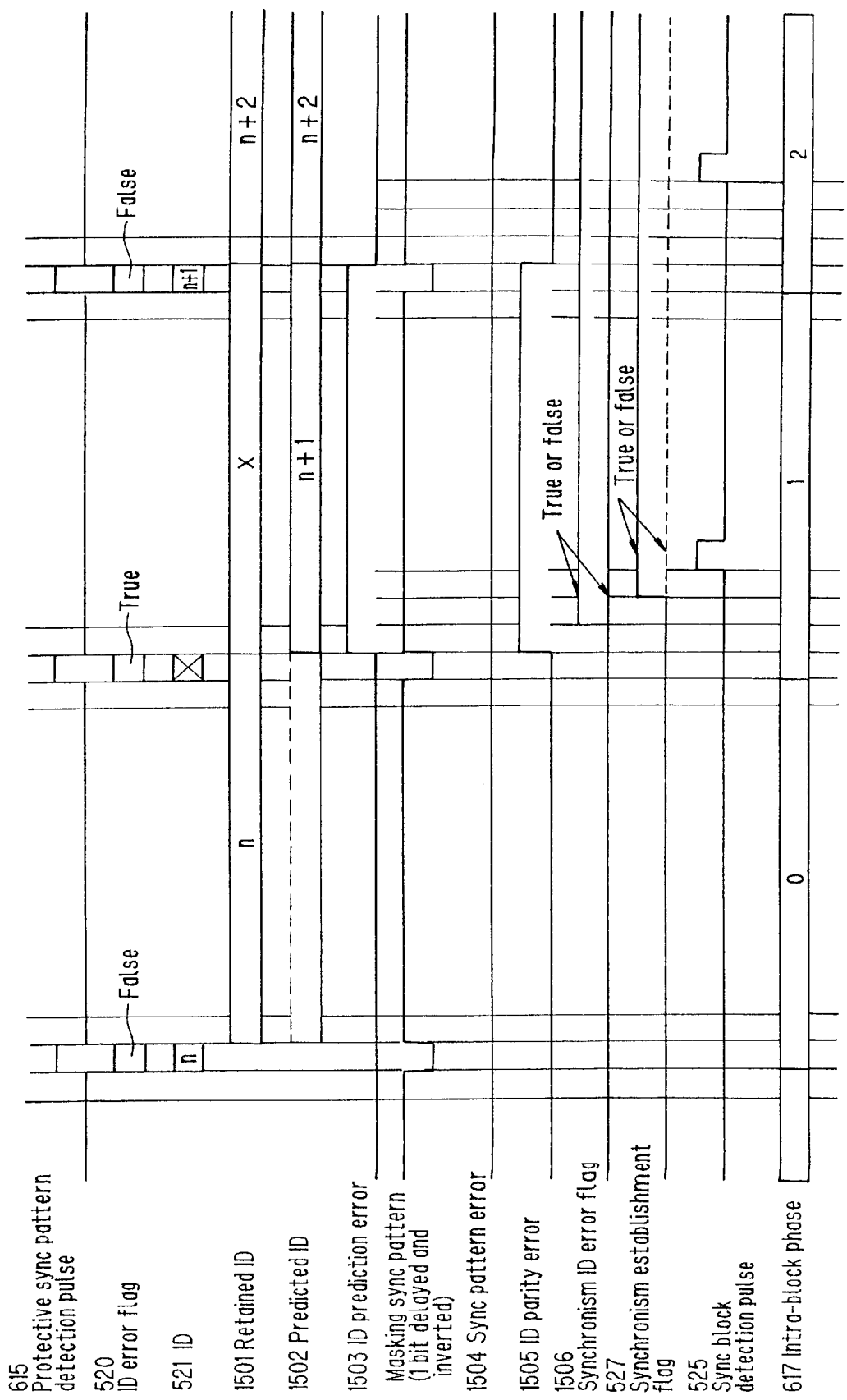

| (25.33) | (33.41) | (41.49) | (50.58) |
|---------|---------|---------|---------|
| 01 | 10 | 00 | 01 |
| 2 | 0 | 1 | 2 |

| 1 | | 2 | | 0 | | 1 |
|---|---|---|---|---|---|---|
| 25 26 27 28 29 30 31 | 32 | 33 35 36 37 38 39 40 41 | 42 43 44 45 46 47 48 49 | | | |
| | | 33 34 36 37 38 39 40 41 | | | | |
| | | 33 34 35 37 38 39 40 41 | | | | |
| | | 33 34 35 36 38 39 40 41 | | | | |
| | | 33 34 35 36 37 39 40 41 | | | | |
| | | 33 34 35 36 37 38 40 41 | | | | |
| | | 33 34 35 36 37 38 39 41 | | | | |
| | | 33 34 35 36 37 38 39 40 | | | | |

1302 Masking sync pattern detection pulse
617 Intra-block phase

| | |
|---|---|
| 0000 | 16 18 19 20 21 22 23 24 |
| 0001 | 16 17 19 20 21 22 23 24 |
| 0010 | 16 17 18 20 21 22 23 24 |
| 0011 | 16 17 18 19 21 22 23 24 |
| 0100 | 16 17 18 19 20 22 23 24 |
| 0101 | 16 17 18 19 20 21 23 24 |
| 0110 | 16 17 18 19 20 21 22 24 |
| 0111 | 16 17 18 19 20 21 22 23 |
| 1000 | 17 18 19 20 21 22 23 24 |

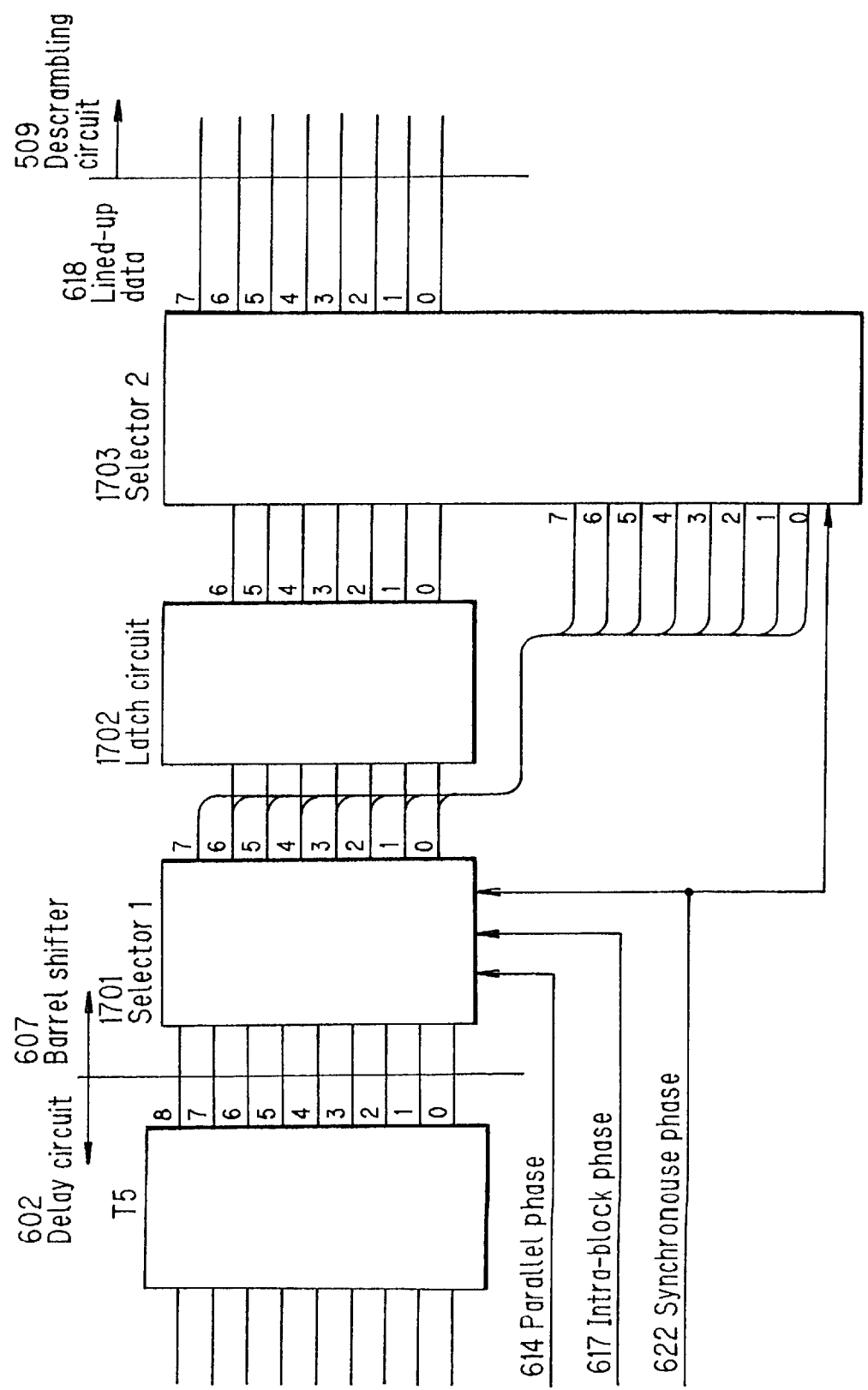

Fig. 18

| Retained parallel phase | Retained synchronous phase | 2 clock before | | 1 clock before | | Predicted position | | 1 clock after | | 2 clock after | |
|---|---|---|---|---|---|---|---|---|---|---|---|
| | | Window | Synchronous phase | Window | Synchronous phase | Window | Synchronous phase | Window | Synchronous phase | Window | Synchronous phase |
| 01 | 0000 | 1 | 0111 | 1 | 1000 | 2 | 0000 | 2 | 0001 | 2 | 0010 |
| 01 | 0001 | 1 | 1000 | 2 | 0000 | 2 | 0001 | 2 | 0010 | 2 | 0011 |
| 01 | 0010 | 2 | 0000 | 2 | 0001 | 2 | 0010 | 2 | 0011 | 2 | 0100 |
| 01 | 0011 | 2 | 0001 | 2 | 0010 | 2 | 0011 | 2 | 0100 | 2 | 0101 |
| 01 | 0100 | 2 | 0010 | 2 | 0011 | 2 | 0100 | 2 | 0101 | 2 | 0110 |
| 01 | 0101 | 2 | 0011 | 2 | 0100 | 2 | 0101 | 2 | 0110 | 2 | 0111 |
| 01 | 0110 | 2 | 0100 | 2 | 0101 | 2 | 0110 | 2 | 0111 | 2 | 0000 |
| 01 | 0111 | 2 | 0101 | 2 | 0110 | 2 | 0111 | 2 | 0000 | 3 | 0001 |
| 10 | 0000 | 1 | 0110 | 1 | 0111 | 2 | 0000 | 2 | 0001 | 2 | 0010 |
| 10 | 0001 | 1 | 0111 | 2 | 0000 | 2 | 0001 | 2 | 0010 | 2 | 0011 |
| 10 | 0010 | 2 | 0000 | 2 | 0001 | 2 | 0010 | 2 | 0011 | 2 | 0100 |
| 10 | 0011 | 2 | 0001 | 2 | 0010 | 2 | 0011 | 2 | 0100 | 2 | 0101 |
| 10 | 0100 | 2 | 0010 | 2 | 0011 | 2 | 0100 | 2 | 0101 | 2 | 0110 |
| 10 | 0101 | 2 | 0011 | 2 | 0100 | 2 | 0101 | 2 | 0110 | 2 | 0111 |
| 10 | 0110 | 2 | 0100 | 2 | 0101 | 2 | 0110 | 2 | 0111 | 3 | 0000 |
| 10 | 0111 | 2 | 0101 | 2 | 0110 | 2 | 0111 | 3 | 0000 | 3 | 0001 |
| 00 | 0000 | 1 | 0110 | 1 | 0111 | 2 | 0000 | 2 | 0001 | 2 | 0010 |
| 00 | 0001 | 2 | 0111 | 2 | 0000 | 2 | 0001 | 2 | 0010 | 2 | 0011 |
| 00 | 0010 | 2 | 0000 | 2 | 0001 | 2 | 0010 | 2 | 0011 | 2 | 0100 |
| 00 | 0011 | 2 | 0001 | 2 | 0010 | 2 | 0011 | 2 | 0100 | 2 | 0101 |
| 00 | 0100 | 2 | 0010 | 2 | 0011 | 2 | 0100 | 2 | 0101 | 2 | 0110 |
| 00 | 0101 | 2 | 0011 | 2 | 0100 | 2 | 0101 | 2 | 0110 | 2 | 0111 |
| 00 | 0110 | 2 | 0100 | 2 | 0101 | 2 | 0110 | 2 | 0111 | 2 | 1000 |
| 00 | 1000 | 2 | 0110 | 2 | 0111 | 2 | 1000 | 2 | 0000 | 3 | 0001 |

SYNCHRONISM DETECTION AND DEMODULATING CIRCUIT

BACKGROUND OF THE INVENTION (1) Field of the Invention

The present invention relates to a synchronism detection and demodulating circuit for reproducing digital data which was divided into sync blocks and recorded in that format.

(2) Description of the Prior Art

There have been digital modulating techniques by which a digital data stream consisting of n-bit words is divided every m words and these are grouped as a unit, each group being added with extra 'p' bits, to produce one block of {(n×m)+p} bits. As an example, the data stream of 8 bit words is divided every three words and these are and grouped as a unit to form a data group of 24 bits, each group being added with extra one bit, to form one block of 25 bits. This method is called the 24/25 modulating scheme.

FIG. 1 shows the track pattern for digital video tape recorders based on the helical scanning technique. The track pattern is composed of four kinds of areas: ITI region where information such as a data format within the track, the absolute position on the track which the rotary head is scanning, etc., is recorded; AUDIO region where the audio signal is recorded; VIDEO region where the video signal is recorded; and SUBCODE region where extra-functional information is recorded, with gaps provided between the regions.

In this track pattern, three regions, i.e., AUDIO region, VIDEO region and SUBCODE region are modulated based on the 24/25 modulation scheme. In FIGS. 2, (A), (B) and (C) show the sync block structures of AUDIO region, VIDEO region and SUBCODE region, respectively. Here, in AUDIO and VIDEO regions, two blocks (called pre-sync blocks) are provided at the beginning of the region and one sync block and change "(two different" to provided at the of a region end. The pre-sync blocks facilitate the detection of the following blocks and the post-sync block indicates the end of the region.

In FIG. 2, a, b and c designate different groups each having an identical block length and the same data format within the sync block.

FIG. 3(1) and FIG. 3(2) show bit patterns of sync blocks. FIG. 3(1) shows a bit pattern before the 24/25 modulation and FIG. 3(2) a bit pattern after the 24/25 modulation. The ID which indicates the order of blocks and extra information for the data before modulation, ID parity for detecting or correcting an error in ID, and the audio signal, video signal, or extra-functional information (the audio signal, video signal and extra-functional information will be generically called 'recording information', hereinbelow), are subjected to a scrambling process for an MOD2 addition of an M-series random signal in order to enhance the random characteristic of the data. Then, in order to prevent the continuation of identical bits and control the d.c. component of the data, one bit is added to three words, or 24 bits. The aforementioned scrambling process is effected in the circuit shown in FIG. 4, where a signal 401 with the extra bit added and a signal 402 which is generated by delaying the signal 401 after the 24/25 modulation by a span of two clock units, are subjected to the MOD2 addition to complete a pre-coding process.

Whether the extra bit is set at '1' or '0' is determined in accordance with the rule of the modulation for preventing the continuation of identical bits and controlling the d.c. component of the data. For a sync pattern, neither the scrambling process nor the pre-coding process is effected, but in order to prevent the continuation of identical bits and control the d.c. component of the data, one of two kinds of sync patterns of 17 bits, which have inverse allocations of bits '1' and '0', is selected to be added prior to the ID.

A conventional synchronism detection and demodulating process for the data recorded based on this 24/25 modulation scheme is now described. With reference to the drawings, the operation of a conventional synchronism detection and demodulating circuit will be explained. FIG. 5 is a block diagram showing a conventional synchronism detection and demodulating circuit. A reference numeral 501 indicates a serial-to-parallel converter circuit which converts regenerative data 512 inputted to a serial input into parallel data 514 of 5 bits and outputs the result whilst receiving a regenerative clock 513 and frequency divides it by 5 to output the result as a parallel clock 515. Designated at 502 is a delay circuit which delays parallel data 514 using shift registers based on parallel clock 515 so as to output delayed parallel data 516 and it also outputs tap data 517 from the mid tap of each register.

Sync pattern detecting circuit 503 detects sync patterns from tap data 517 and outputs a sync pattern detection pulse 518 which will become true when a sync pattern is detected while the aftermentioned window 528 is set to be true, and outputs a synchronous phase 519 indicating at which position the beginning of the sync pattern is located in the five bits of parallel data 514.

ID detecting circuit 504 detects the ID and ID parity of tap data 517 when the aftermentioned protective sync pattern detecting pulse 522 has become true, based on synchronous phase 519. Circuit then outputs the detected ID 521 and checks ID errors based on the detected ID and ID parity to output an ID error flag 520 which will become true when the ID contains errors.

Sync block protecting circuit 505 checks whether there is a sync block within parallel data 514, based on sync pattern detection pulse 518, ID 521, ID error flag 520, synchronous phase 519 and window 528 which is outputted from the window circuit 506 which will be explained later. If circuit 505 determines that there is a sync block, it outputs a synchronism establishment flag 527 which becomes true if a sync block has been found. After the flag becomes true, the sync pattern and ID are checked at the predictive position indicated by window 528 and then, if errors occur N times (N is an integer equal to 1 or above) in a row, this flag 527 becomes false. Circuit 505 further outputs a sync block detection pulse 525 which indicates the beginning of the sync block, based on sync pattern detection pulse 518 when sync pattern detection pulse 518 has become true while window 528 is true, or by determining the beginning of the sync block based on window 528 even when the sync pattern detection pulse is false while window 528 is true and if synchronism establishment flag 527 is true. The circuit 505 also outputs a retained synchronous phase 524 which is held by sampling synchronous phase 519 at the moment when sync pattern detection pulse 518 becomes true while window 528 is true and outputs an protection ID 526 by correcting the ID, if it contains any error, based on the continuity of ID.

Window circuit 506 predicts which position the next sync pattern falls based on synchronism establishment flag 527, sync block detection pulse 525, protection ID 526 and retained synchronous phase 524 and outputs the predictive position and window 528 which becomes true only when the synchronism establishment flag stays false.

Barrel shifter 507 and a rate converter circuit 508, based on sync block detection pulse 525 and retained synchronous phase 524, delete extra bits in delayed parallel data 516 and output converted parallel data 529 made up of 8 bits which was converted from delayed parallel data 516 made up of 5 bits. This rate converter circuit 508 has memory capable of storing about 90 bytes (one sync).

Descrambling circuit 509, in order to undo the scrambling process which was performed at recording, carries out a descrambling process by which an MOD2 addition of the identical M-series random signal is performed at the same timing as that at the recording operation, thus outputting descrambled data 530.

Modified ID inserting circuit 510 inserts a protection ID 526 into a position at the beginning of descrambled data 530 to output demodulated data 531.

Serial-to-parallel converter circuit 501 receives serial regenerative data 512, or x(0), x(1), x(2) . . . , in this order, and outputs parallel data 514, or X(0,4), X(5,9), X(10,14) . . . , in this order. Here, X(0,4) represents the data from x(0) to x(4) arranged in parallel. Delay circuit 502 is composed of nine-step shift registers each made up of five bits. The first register is designated at T1, the second one is designated at T2, and in this way, the final register is designated at T9.

Regenerative data 512 is the data which was detected at partial response (1, 0, −1). Since the sync pattern is not pre-coded, the leading two bits within the 17 bits of the sync pattern can not take fixed values because they are affected by the two bits right before the sync pattern. Therefore, sync pattern detecting circuit 503 detects 15 bits from the rear end within 17 bits of the reproduced sync pattern as a sync pattern. From now on, the leading position of a sync pattern of 15 bits is referred to as the beginning of the sync pattern. Since regenerative data 512 inputted in serial is converted into 5 bit parallel data, regardless of the position in the sync pattern, there are five positions at which the beginning of the sync pattern can be located.

An example where X(0,4) is outputted to T9 is now be considered. In this case, sync pattern detecting circuit 503 receives as tap data, T9, T8, T7, each made up of 5 bits and the leading 4 bits of T6, in total, 19 bits (X(0, 18)). ID detecting circuit 504 receives as tap data, T6, T5, T4, T3 and T2, each made up of 5 bits and the leading 4 bits of T1, in total, 29 bits (X(15, 43)).

Sync pattern detecting circuit 503 causes sync pattern detection pulse 518 to be true when the beginning of a sync pattern is detected from the output from T9, and determines synchronous phase 519 that indicates at which bit in T9 the beginning of the sync pattern is located. For example, when the beginning of the sync pattern is at X(0), synchronous phase 519 is set at '000'. When the beginning of the sync pattern is at X(4), synchronous phase 519 is set at '100' in order to indicate that the beginning of the sync pattern is in the final bit in T9.

ID detecting circuit 504 detects the ID within tap data 517 and its ID parity based on sync pattern detection pulse 518 and synchronous phase 519. For example, if synchronous pattern detection pulse 518 is true and at the same time, synchronous phase 519 is '000', one byte in the front half of the ID (to be referred to as ID0, hereinbelow) is found to be X(15, 22), one byte in the rear half of the ID (to be referred to as ID1, hereinbelow) is to be X(24, 31), and the ID parity (to be referred to as IDP) is to be X(32, 39). If sync pattern detection pulse 518 is true and at the same time synchronous phase 519 is '100', the ID0 is found to be X(19, 26), the ID1 is to be X(28, 35) and the IDP is to be (36, 43). ID detecting circuit 504 outputs the detected ID 521, and checks errors of the ID based on the ID parity to output ID error flag 520.

When synchronism establishment flag 527 is false, sync block protecting circuit 505 judges that there is a sync block if window 528 and sync pattern detection pulse 518 are true and if ID error flag 520 is false, and it causes sync block detection pulse 525 and synchronism establishment flag to be true and loads synchronous phase 519 to retain it as retained synchronous phase 524. When synchronism establishment flag 527 is true, the flag 527 will be set to be false if the state in which at least any one of the following conditions 1, 2 and 3 is not satisfied has been detected N times in a row.

The conditions to be checked are: in the duration within which window 528 is true, Condition 1—sync pattern detection pulse 518 is true;

Condition 2—ID error flag 520 is false; and

Condition 3—the ID predicted from the ID 521 which was detected when past ID error flag 520 was false corresponds to the currently detected ID 521.

For synchronism protection, in the duration within which synchronism establishment flag 527 is true, if sync pattern detection pulse 518 does not become true while the window is true, the position of sync pattern detection pulse 518 is predicted based on window 528 so that sync block detection pulse 525 is caused to be true to retain the previous value of retained synchronous phase 524. For the purpose of ID protection, even if sync pattern detection pulse 518 remains true or if ID error flag 520 at the predicted position of sync pattern detection pulse 518 is true, the current ID is predicted based on the past ID of the sync block so as to output protection ID 526.

Window circuit 506 predicts the position of the next sync pattern based on sync block detection pulse 525 and protection ID 526 and outputs window 528. Barrel shifter 507 calculates the leading position of the synchronism based on retained synchronous phase, and rearranges the data so as to output the arranged data. Rate converter circuit 508 writes 24 bits other than extra bits in the lined-up data 532 into the memory. The data stored in the memory is read out per 8 bits based on a different clock to output converted parallel data 529. Descrambling circuit 509 performs the MOD2 addition of the converted parallel data 529 to the same M-series random signal at recording, outputting descrambled data 530. The modified ID is inserted into the beginning of descrambled data 530, producing demodulated data 531, which is sent to a code error correcting section 511.

In a modulating scheme in which p bits are added as extra bits to m words, when p is not an integer multiple of m (in the conventional example, m=3, p=1; p is one-third of m), there are some cases where demodulated data which is arranged based on word units cannot be obtained if the synchronism detection and demodulating process are effected with reference to a frequency divided clock which is regularly divided as in the conventional example. Therefore, memory for a rate converter circuit for converting the data width, is needed. If due to some reason the frequency of the clock for performing a synchronism detecting process largely shifts from that of the clock for the code error correcting section, there is a risk that erroneous data might be supplied to the code error correcting section; for example, the data before being written in might be read out. Moreover, if this synchronism detection and demodulating section and the code error correcting section are integrated into one chip as an LSI, two cycles of the clocks of 5 bit cycle and 8 bit cycle are present so that the circuit structure becomes complicated to match the timing between these clocks.

SUMMARY OF THE INVENTION

Conventionally, when the data which is subjected to synchronism detection and the data in the code error correcting section differed in data width from each other, special readout of the data was performed using an irregular clock etc., while a memory means for rate convention was essentially needed. In view of this problem, it is an object of the invention to provide a synchronism detection and demodulating circuit which can directly pick up the necessary data from the register without needing special memory for the data width conversion.

The present invention has been devised in order to attain the above object, and the gist of the invention will be as follows:

In accordance with a first aspect of the invention, a synchronism detection and demodulating circuit for performing synchronism detection and demodulation of a reproduced data stream which was recorded based on a modulating scheme whereby a digital data stream consisting of n-bit words is divided every m words and these are grouped as a unit, each group being added with extra 'p' bits ('p' is not an integer multiple of 'm'), to produce one block of {(n×m)+p} bits, comprises:

- a first circuit which shapes the serially inputted regenerative data into a parallel form using an irregularly frequency-divided clock signal which is frequency divided by m/((n×m)+p);
- a second circuit which detects sync patterns from the data in the parallel form from the first circuit whilst deleting redundant part in the parallel data;
- a third circuit which detects ID information from the data in the parallel form from in the first circuit whilst deleting redundant part in the parallel data;
- a fourth circuit which effects synchronism protection based on the information from the second and third circuits; and
- a fifth circuit which rearranges the data in the parallel form from the first circuit, based on the information from the fourth circuit whilst deleting the extra bits and redundant part in the parallel data.

In accordance with a second aspect of the invention, a synchronism detection and demodulating circuit for performing synchronism detection and demodulation of a reproduced data stream which was recorded based on a modulating scheme whereby a digital data stream consisting of n-bit words is divided every m words and these are grouped as a unit, each group being added with extra 'p' bits ('p' is not an integer multiple of 'm'), to produce one block of {(n×m)+p} bits, has the above first feature and is constructed such that the first circuit produces a flag for deleting redundant part in the parallel data.

In accordance with a third aspect of the invention, a synchronism detection and demodulating circuit for performing synchronism detection and demodulation of a reproduced data stream which was recorded based on a modulating scheme whereby a digital data stream consisting of n-bit words is divided every m words and these are grouped as a unit, each group being added with extra 'p' bits ('p' is not an integer multiple of 'm'), to produce one block of {(n×m)+p} bits, has the above first feature and is constructed such that the second circuit, whilst detecting sync patterns, deletes redundant part in the parallel data, using a flag obtained from the first circuit for deleting the redundant part in the parallel data, and produces a flag for identifying the position of a sync pattern in the parallel data whilst taking into account the presence of the redundant part in the parallel data.

In accordance with a fourth aspect of the invention, a synchronism detection and demodulating circuit for performing synchronism detection and demodulation of a reproduced data stream which was recorded based on a modulating scheme whereby a digital data stream consisting of n-bit words is divided every m words and these are grouped as a unit, each group being added with extra 'p' bits ('p' is not an integer multiple of 'm'), to produce one block of {(n×m)+p} bits, has the above first feature and is constructed such that the third circuit deletes redundant part of the parallel data, using a flag obtained from the first circuit for deleting the parallel data redundantly formed, whilst detecting ID information in the parallel data using a flag obtained from the parallel data for identifying the position of a sync pattern from the second circuit.

In accordance with a fifth aspect of the invention, a synchronism detection and demodulating circuit for performing synchronism detection and demodulation of a reproduced data stream which was recorded based on a modulating scheme whereby a digital data stream consisting of n-bit words is divided every m words and these are grouped as a unit, each group being added with extra 'p' bits ('p' is not an integer multiple of 'm'), to produce one block of {(n×m)+p} bits, has the above first feature and is constructed such that the fourth circuit produces a flag for indicating positions of extra bits in the parallel data, whilst performing synchronism protection.

In accordance with a sixth aspect of the invention, a synchronism detection and demodulating circuit for performing synchronism detection and demodulation of a reproduced data stream which was recorded based on a modulating scheme whereby a digital data stream consisting of n-bit words is divided every m words and these are grouped as a unit, each group being added with extra 'p' bits ('p' is not an integer multiple of 'm'), to produce one block of {(n×m)+p} bits, has the first feature and is constructed such that the fifth circuit rearranges the data, based on a flag generated in the first circuit for deleting the redundant part of the parallel data, a flag generated in the second circuit for identifying the position of a sync pattern in the parallel data and a flag generated in the fourth circuit for indicating positions of extra bits in the parallel data, whilst performing synchronism protection.

Finally, in accordance with the seventh to twelfth aspects of the invention, a synchronism detection and demodulating circuit has one of the first to sixth features and is constructed such that 'n', 'm' and 'p' are set at 8, 3 and 1, respectively.

Since the demodulated data which is obtained by the synchronism detection and demodulating process of the invention, is given in the form of data lined up as word units, it is possible to subject the data to the code error correcting processing section without passing it through a rate converting circuit.

BRIEF DESCRIPTION OF THE DRAWINGS

FIG. 1 is a view showing the track format of digital video tape recorders of a helical scanning scheme;

FIG. 2 is data layout diagram showing AUDIO, VIDEO and SUBCODE regions in the present invention;

FIG. 14 is a timing chart concerning a first example of the sync block protecting circuit portion of the invention;

FIG. 15 is a timing chart concerning a second example of the sync block protecting circuit portion of the invention;

Figure 16C-2:
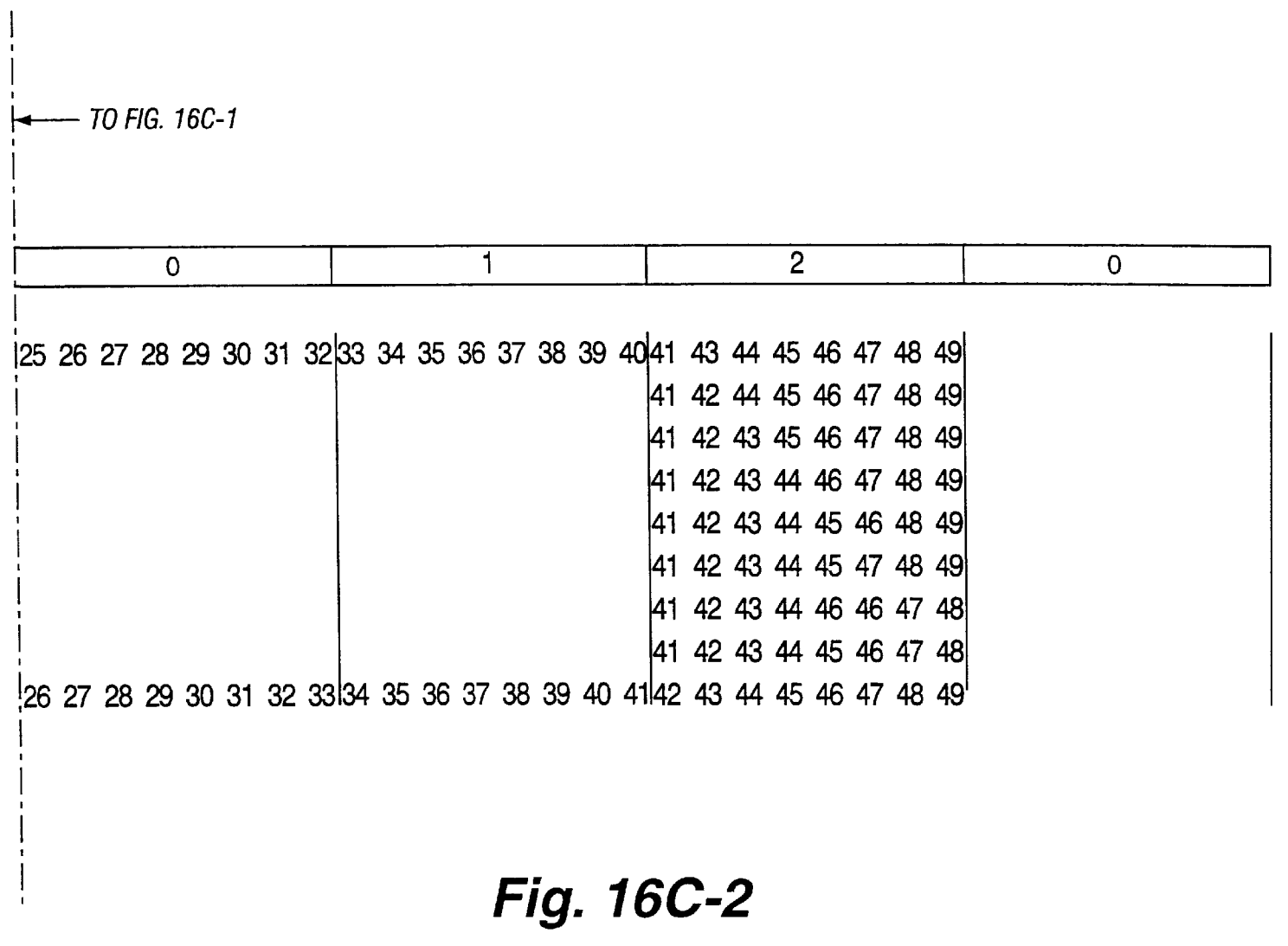

FIGS. 16A1, 16A2, 16B1, 16B2, 16C1, and 16C2 are charts chart showing the procedure of a 9 bit to 8 bit conversion in the invention;

FIG. 17 is a detailed diagram showing the barrel shifter in a synchronism detection and demodulating circuit of the invention; and FIG. 18 is a table showing relationship between the beginning of the sync pattern detection pulse and the window depending upon the retained parallel phase and retained synchronous phase.

DESCRIPTION OF THE PREFERRED EMBODIMENTS

Explanation of the data configuration, the modulating scheme and the like in the invention are the same as those in the conventional example. Therefore, the description will not be repeated herein. A synchronism detection and modulating process of the invention for the data which was recorded on the 24/25 modulating scheme will be described.

Figure 3:
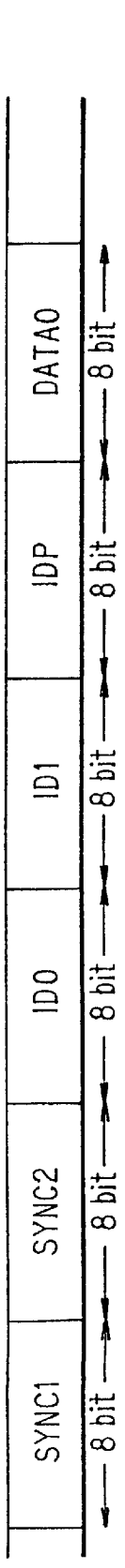
FIG. 3(1) and FIG. 3(2) are diagrams showing bit patterns before and after the $24/25$ modulation.
Figure 3:
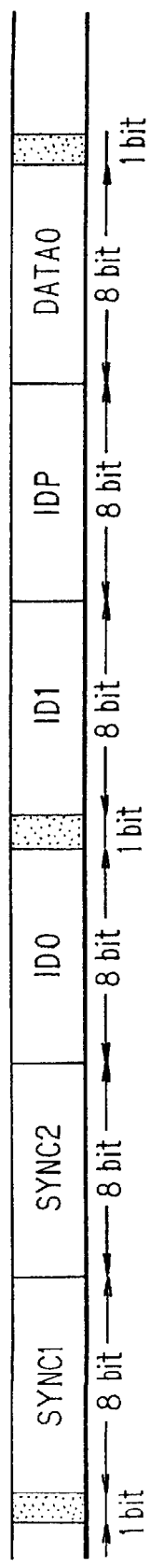
Figure 4:
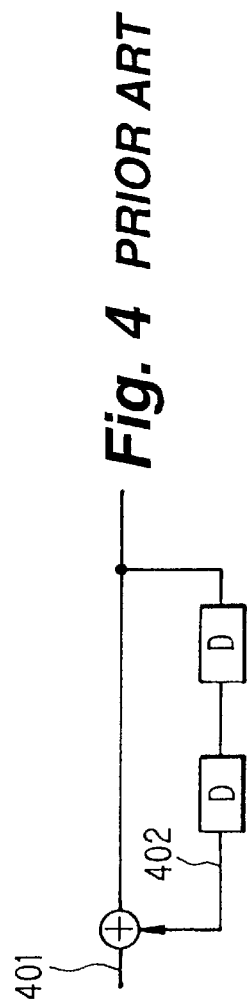
FIG. 4 is a block diagram showing a pre-coding section in the invention.
Figure 5:
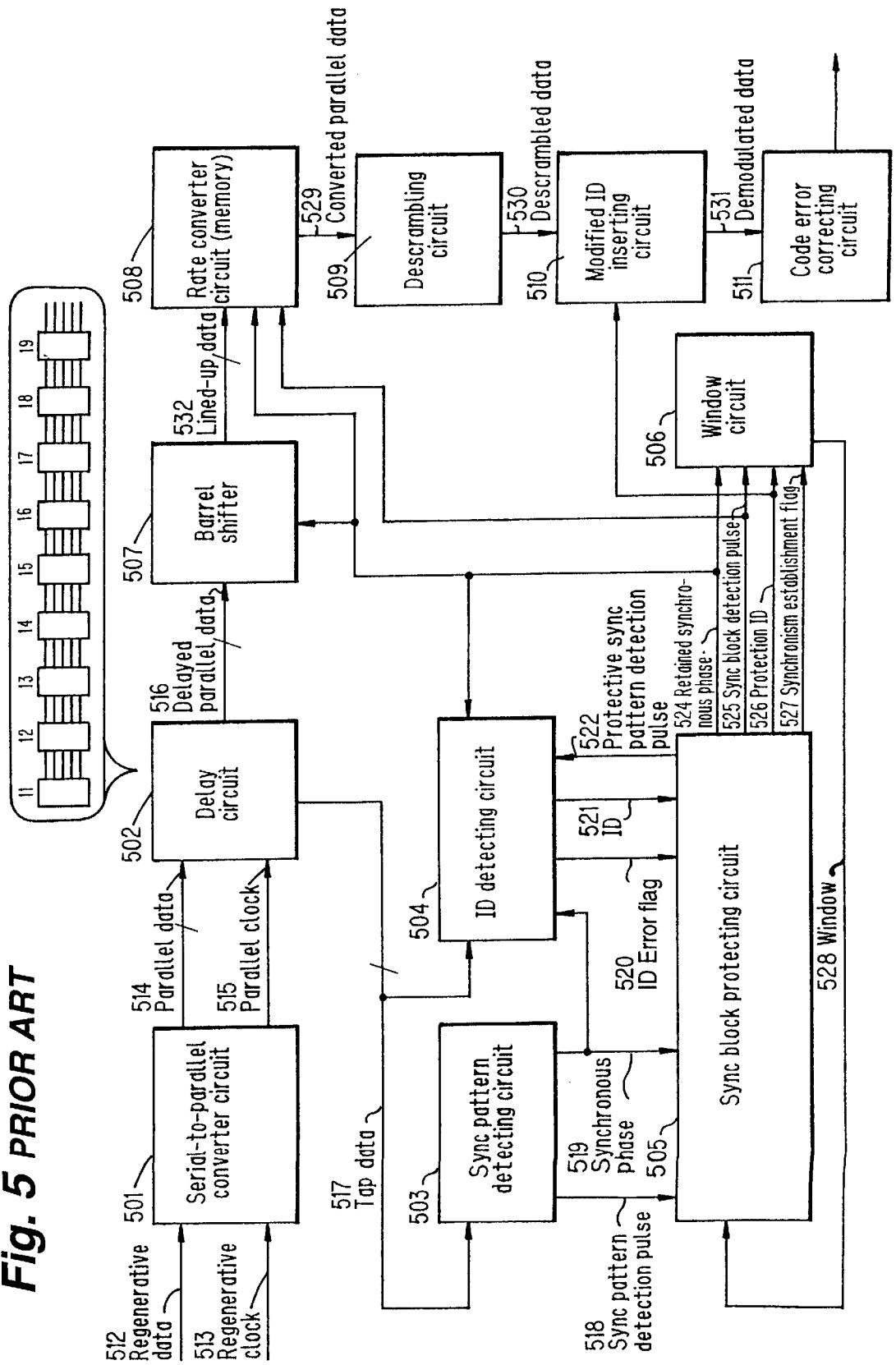
FIG. 5 is a diagram showing a conventional synchronism detection and demodulating circuit.
Figure 6:
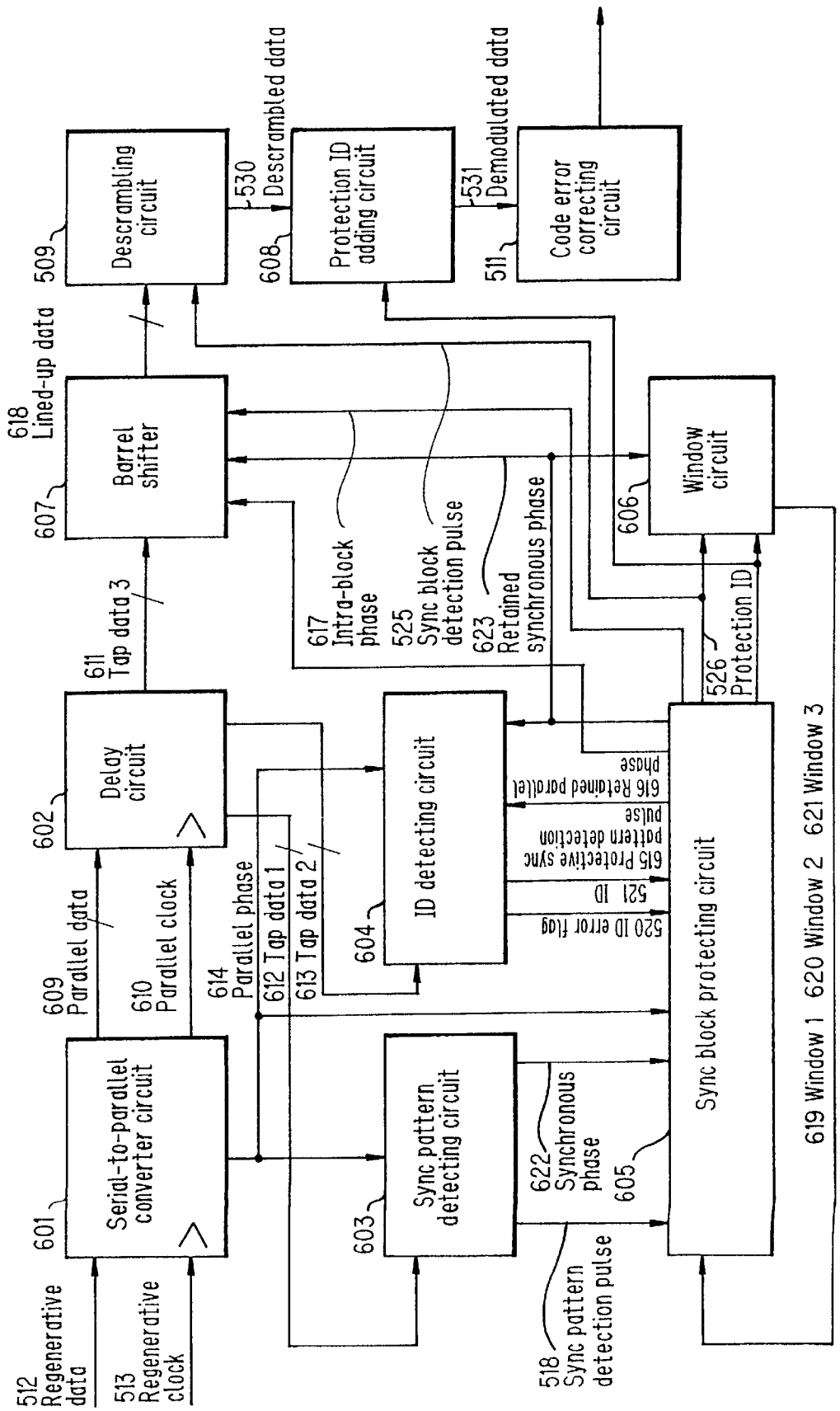
FIG. 6 is a diagram showing a synchronism detection and demodulating circuit of the invention.

Referring now to FIG. 6, the operation of a synchronism detection and modulating process of the invention will be described.

A serial-to-parallel converter circuit 601, based on the clock pulses from a regenerative clock 513, outputs a parallel clock 610 having a cycle of 25 clock units which are irregularly divided in 9 clock units, 8 clock units and 8 clock units. Circuit 601 also outputs parallel data 609 obtained by shaping regenerative data 512 into a parallel form with 9 bit width based on parallel clock 610. The circuit 601 further outputs a parallel phase signal 614 providing phase information on the parallel clock containing the irregularity.

Delay circuit 602 delays parallel data 609 using shift registers based on parallel clock 610 so as to output tap data 1 (612), tap data 2 (613) and tap data 3 (611) from respective output taps of the resisters.

Sync pattern detecting circuit 603 detects sync patterns from tap data 1(612) and outputs a sync pattern detection pulse 518. Sync pattern detection pulse 518 will become true when a sync pattern is detected. Circuit 603 outputs a synchronous phase 622 indicating in which position the beginning of the sync pattern is located in the nine bits of the parallel data.

ID detecting circuit 604 detects the ID and ID parity of tap data 2 (613) and outputs the detected ID 521. Circuit 204 also checks ID errors based on the detected ID and ID parity and outputs an ID error flag 520 which will become true when the ID contains errors.

Sync block protecting circuit 605 checks whether there is a sync block within parallel data 609, and if circuit 605 determines that there is a sync block, circuit 605 masks sync pattern detection pulse 518 which becomes true at an unexpected position, in order to prevent erroneous detection of a sync pattern. Further, circuit 605 outputs a protective sync pattern detection pulse 615 based on the position where sync pattern detection pulse 518 is predicted to become true even if sync pattern detection pulse 518 does not become true within the range where sync pattern detection pulse 518 is not true. Circuit 605 also outputs a retained synchronous phase 623 which is held by sampling synchronous phase 622 and a retained parallel phase 616 which is held by sampling parallel phase 614 only when sync pattern detection pulse 518 becomes true at the expected position.

Even if ID error flag 520 is true, circuit 605 predicts the current ID based on the continuity of ID, using the previous ID which was detected when ID error flag 520 was false, and outputs the predicted ID as protection ID 526. Then, circuit 605 performs the following three checks: a first check, whether sync pattern detection pulse 518 is true at the predicted position; a second check, whether ID error flag 520 is false; and a third check, whether the detected ID matches the predicted ID. When the sync block is judged to be present within parallel data 609, circuit 605 outputs a sync block detection pulse 525 and an intra-block phase 617 providing the information on the position where the extra bit is present within the sync block.

Window circuit 606 outputs three windows, namely, window 1(619), window 2(620) and window 3(621), which become true (1) at the time one clock unit before the predicted position where the next sync pattern detection pulse 518 will become true (2), at the predicted position, and (3) at the time one clock unit after it, respectively.

Barrel shifter 607 deletes extra bits in tap data 3(611) and outputs lined-up data 618 of 8 bit words as units.

Descrambling circuit 509, in order to undo the scrambling process which was performed at recording, carries out a descrambling process, outputting descrambled data 530.

Protection ID adding circuit 608 adds protection ID 526 at the beginning of descrambled data 530 to output demodulated data 531.

Code error correcting circuit 511 corrects errors in demodulated data 531.

Figure 7:
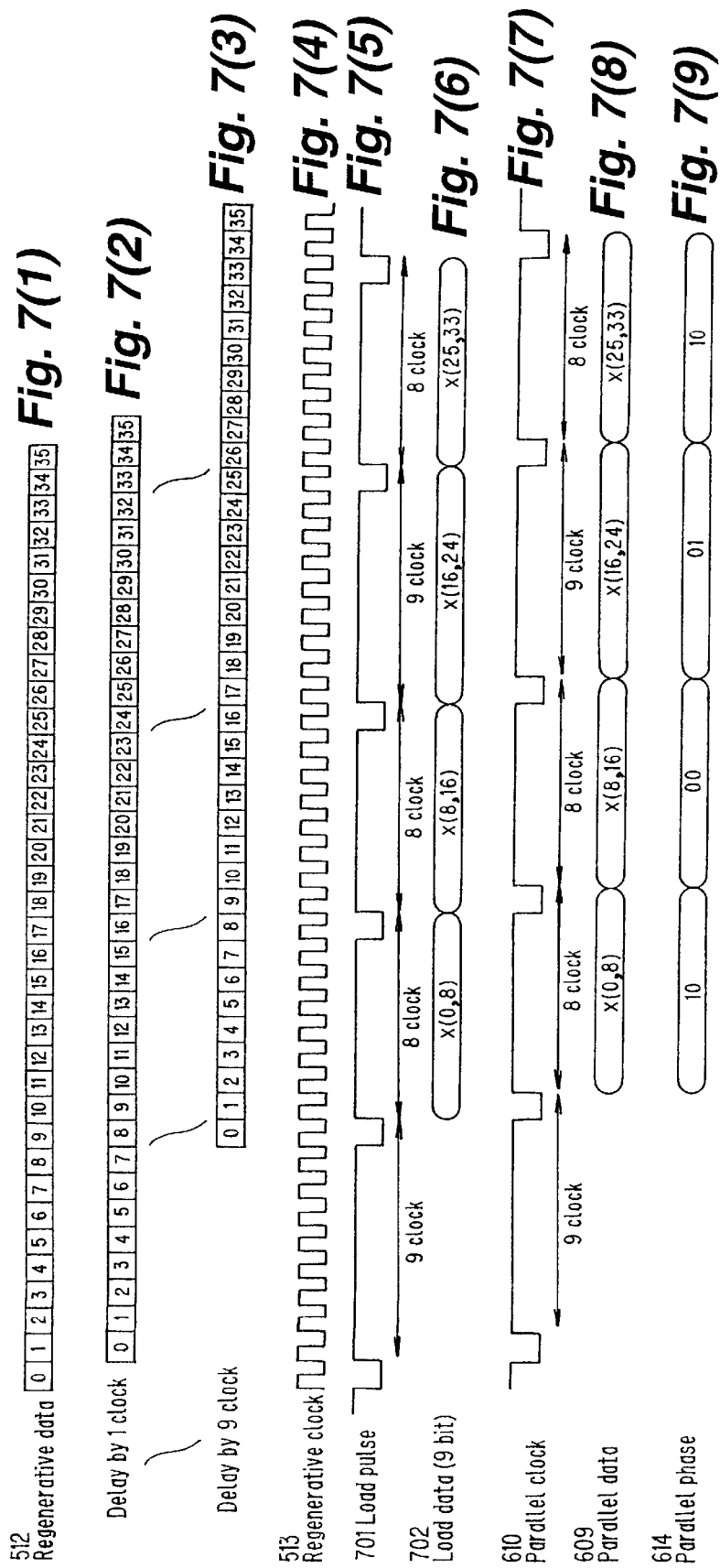
FIG. 7(1)–FIG. 7(9) are timing charts in the serial-to-parallel converter circuit portion of the invention.

Serial-to-parallel converter circuit 601 receives regenerative data 512 serially, inputting x(0), x(1), x(2). in this order into its 9 bit shift register as shown in FIG. 7(1). The serially inputted data is converted into 9 bit parallel load data 702 based on a load pulse signal 701 having a cycle of 25 clock units which are irregularly divided in 9 clock units, 8 clock units and 8 clock units of regenerative clock 513. The data is then latched by parallel clock 610 which is a clock generated by delaying load pulse signal 701 by one clock unit, and the latched data is outputted as parallel data 609, or X(0,8), X(8,16), X(16,24) . . . , in this order.

X(0,8) represents the data from x(0) to x(8) arranged in parallel. In X(0,8), the bit corresponding to x(0) is allotted to the leading bit, the bit corresponding to x(0) to the first bit, the bit corresponding to x(2) to the second bit, and similarly, the bit corresponding to x(7) to the seventh bit, and the bit corresponding to x(8) to the final bit. For other parallel data X(8, 16) etc., the bit corresponding to x(8) is allotted to the leading bit, and similarly, the bit corresponding to x(16) to the final bit.

Since regenerative data 512 is made into the parallel arrangement of 9 bits in width based on load pulse signal 701 having a cycle of 25 clock units which are irregularly divided in 9 clock units, 8 clock units and 8 clock units of regenerative clock 513, 27 bits, i.e., for 3 clock units, of parallel data 609 contain two bits redundantly appearing in the data arranged in parallel.

In the above case, x(8) and x(16) are the data redundantly appearing in the parallel data. Parallel phase signed 614 is the signal indicating the positions of the data redundantly appearing in the parallel data. Parallel phase signed 614 is made up of two bits and like the parallel data 609 it is synchronized with parallel clock 610. Here, parallel phase signed 614 is defined to be '10' for the period where parallel data 609 is X(0,8), '00' for the period where parallel data 609 is X(8,16), and '01' for the period where parallel data 609 is X(16,24). In other words, when the parallel phase is '10', the redundant data is present at the final bit in the parallel data 609; when the parallel phase is '00', the redundant data is present at the leading and final bits in the parallel data 609; and when the parallel phase is '01', the redundant data is present at the leading bit in the parallel data 609.

Figure 8:
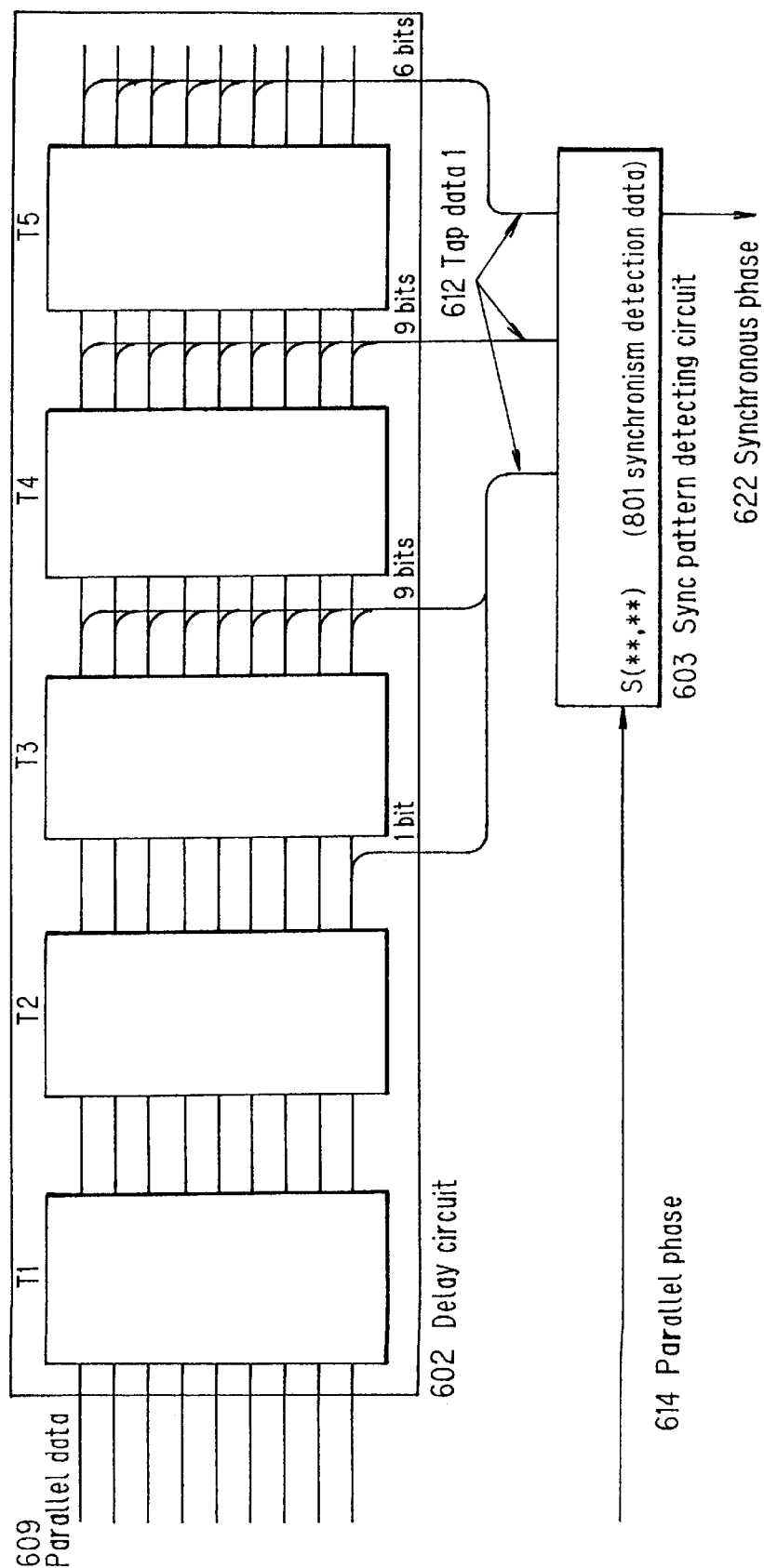
FIG. 8 is a detailed diagram showing the delay block portion in a synchronism detection and demodulating circuit of the invention.

Delay circuit 602 is made up of five-stages of 9 bit shift registers. The first register is termed T1, the next register T2. In this way, the final register is termed T5. FIG. 8 is a diagram showing the outputs from respective registers where parallel data 609 was shifted. In order to differentiate the output from each register from the others, the parallel data X(0,8) which was shifted and is outputted from register T1 is renamed as T1(0,8), for example.

Regenerative data 512 in this embodiment is the data which was detected at partial response (1,0,−1). Since the sync pattern is not pre-coded, the leading two bits within the 17 bits of the sync pattern can not take fixed values because they are affected by the two bits right before the sync pattern. Further, although two kinds of sync patterns which have inverse allocations of bits were selectively recorded when recording was performed, the sync pattern of 15 bits other than the leading two bits contained in regenerative data 512 differs from the sync pattern at recording but is fixed at one kind of value. Accordingly, sync pattern detecting circuit 603 detects 15 bits other than leading two bits in the 17 bits of the reproduced sync pattern, as a sync pattern. From now on, the leading position of a sync pattern of 15 bits is referred to as the beginning of the sync pattern. Since regenerative data 512 inputted in serial is converted into 9 bits of parallel data, regardless of the position in the sync pattern, there are nine positions at which the beginning of the sync pattern can be located. The extra bit is located prior to the leading two bits at the beginning of each sync pattern of 15 bits and appears at the same position every three clock units in the parallel clock 610.

Figure 9:
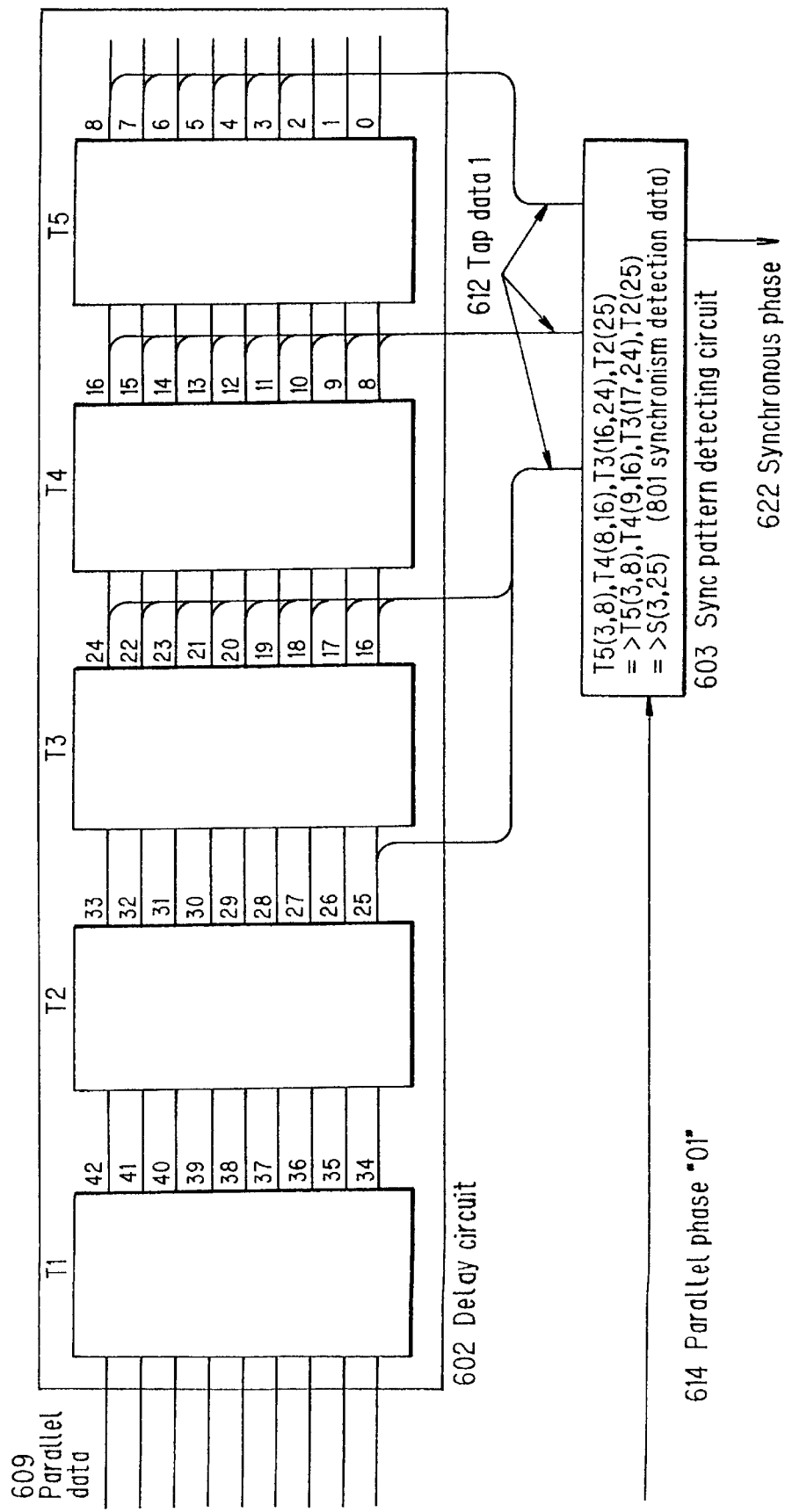
FIG. 9 is a detailed diagram showing a first example of the delay block portion in a synchronism detection and demodulating circuit of the invention.
Figure 10:
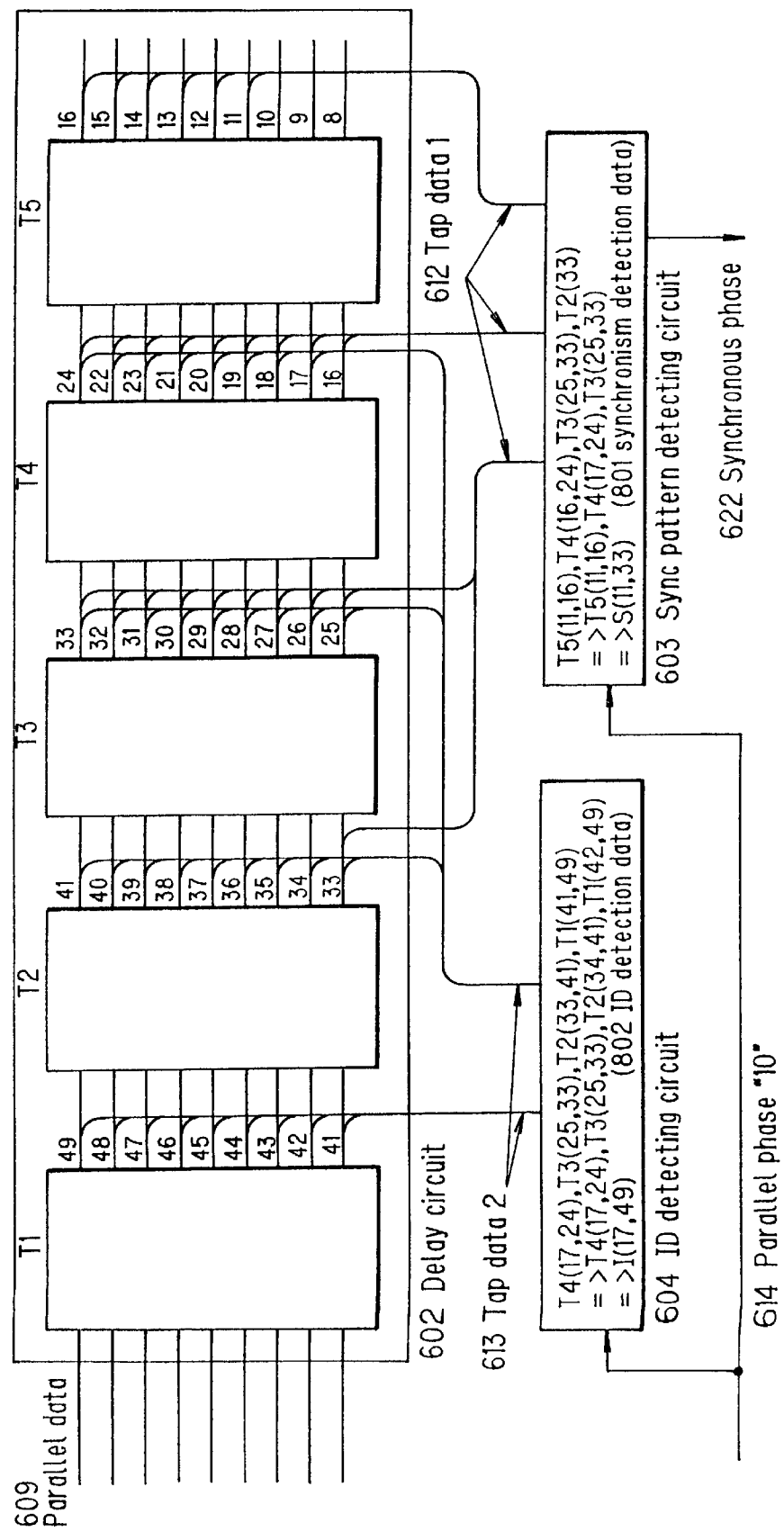
FIG. 10 is a detailed diagram showing a second example of the delay block portion in a synchronism detection and demodulating circuit of the invention.
Figure 11:
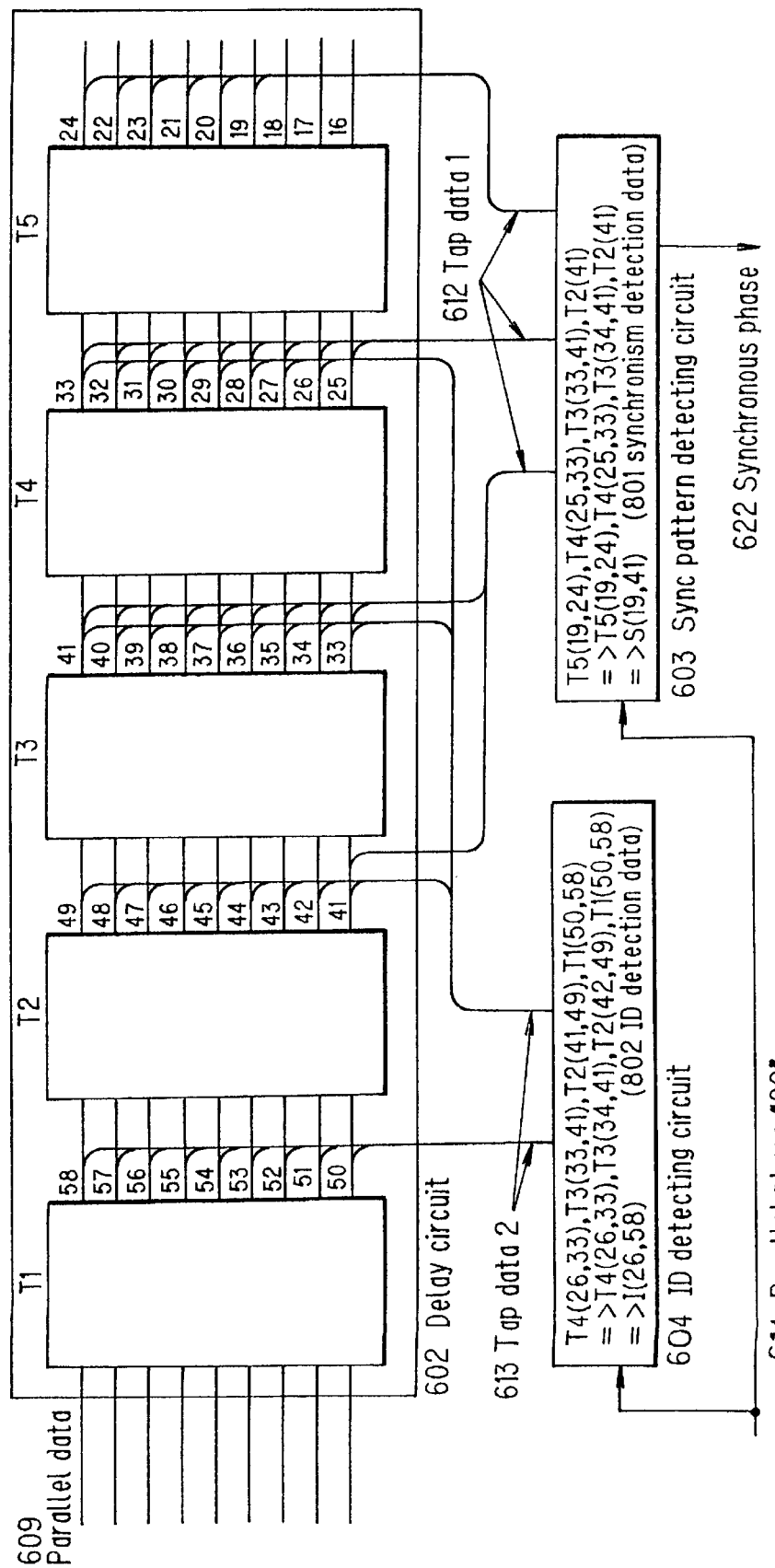
FIG. 11 is a detailed diagram showing a third example of the delay block portion in a synchronism detection and demodulating circuit of the invention.

Sync pattern detecting circuit 603 receives as tap data 1(612), 6 bits from the rear side of T5, 9 bits each for T4 and T3, the leading one bit of T2, in total 25 bits, and deletes the redundant parallel data within tap data 1 using parallel phase 614. When parallel phase 614 is set at '01' as shown in FIG. 9, the final bit of T5 and the leading bit of T4 are redundant, the final bit of T4 and the leading bit of T3 also being redundant. When parallel phase 614 is set at '10' as shown in FIG. 10, the final bit of T5 and the leading bit of T4 are redundant, the final bit of T3 and the leading bit of T2 also being redundant. When parallel phase 614 is set at '00' as shown in FIG. 11, the final bit of T4 and the leading bit of T3 are redundant, the final bit of T5 and the leading bit of T2 also being redundant. One of each redundant pair of bits is deleted to construct the synchronism detection data.

For example, in the case of FIG. 9 where parallel phase 614 is '01', sync pattern detecting circuit 603 receives T5(3,8), T4(8,16), T3(16,24) and T2(25) as tap data 1(612). If the leading one of the redundant bits is deleted, tap data 1(612) will become T5(3,8), T4(9,16), T3(17,24) and T2(25). This produces synchronism detection data 801 which will be represented by S(3,25).

In the case of FIG. 10 where parallel phase 614 is '10' sync pattern detecting circuit 603 receives T5(11,16), T4(16, 24), T3(25,33) and T2(33) as tap data 1(612). After the leading one of the redundant bits is deleted, tap data 1(612) will become T5(11,16), T4(17,24), T3(25,33), thus producing synchronism detection data 801 represented by S(11,33).

In the case of FIG. 11 where parallel phase 614 is '00', sync pattern detecting circuit 603 receives T5(19,24), T4(25, 33), T3(33,41) and T2(41) as tap data 1(612). After the leading one of the redundant bits is deleted, tap data 1(612) will become T5(19,24), T4(25,33), T3(34,41), thus producing synchronism detection data 801 represented by S(19,41).

As a result, whatever parallel phase 614 is, synchronism detection data 801 will be formed into a row of data with a 23 bit width from serially inputted data. In the above example, the leading one of the redundant bits was deleted, but the rear one of the redundant bits may alternatively be deleted. It is also possible to selectively delete either leading or rear one of the redundant bits, without any change of the function.

Sync pattern detection pulse 518 will become true when the sync pattern of 15 bits is detected within synchronism detection data 801. The position of the sync pattern is determined as follows depending upon parallel phase 614.

| Sync phase/Parallel phase | '01' | '10' | '00' |
|---|---|---|---|
| '0000' | S( 3,17) | S(11,25) | S(19,33) |
| '0001' | S( 4,18) | S(12,26) | S(20,34) |
| '0010' | S( 5,19) | S(13,27) | S(21,35) |
| '0011' | S( 6,20) | S(14,28) | S(22,36) |
| '0100' | S( 7,21) | S(15,29) | S(23,37) |
| '0101' | S( 8,22) | S(16,30) | S(24,38) |
| '0110' | S( 9,23) | S(17,31) | S(25,39) |
| '0111' | S(10,24) | S(18,32) | S(26,40) |
| '1000' | S(11,25) | S(19,33) | S(27,41) |

Synchronous phase 622 is a signal indicating the beginning of the sync pattern within synchronism detection data 801 and is represented in such a manner that when parallel phase 614 is '01' as shown in FIG. 9 and the beginning of the sync pattern is located at the leading bit of synchronism detection data 801, specifically S(3,17), synchronous phase 622 is set at '0000', and when the beginning of the sync pattern is located at the second bit of synchronism detection data 801, or S(4,18), synchronous phase 622 is set at '0001'.

From the above table, the sync pattern detected when synchronism phase 622 is '1000' during the period where parallel phase 614 is '01', is also detected when synchronism phase 622 is '0000' during the period where parallel phase 614 is '10'. Also, the sync pattern detected when synchronism phase 622 is '1000' during the period where parallel phase 614 is '10', is also detected when synchronism phase 622 is '0000' during the period where parallel phase 614 is '00'.

This causes a problem that the same pattern is detected twice. To avoid this, the operation is regulated so that the sync patterns which belong to '1000' will be detected only when parallel phase 614 is '00'. Specifically, the sync pattern residing at S(11,25) during the period where parallel phase 614 is '01' as well as the sync pattern residing at S(19,33) during the period where parallel phase 614 is '10' is neglected.

Using the process stated above, sync pattern detecting circuit 603 can detect the sync pattern wherever the sync pattern is located within parallel data 609 and cause sync pattern detection pulse 518 to be true, without detecting the same sync pattern twice. Further, the configuration of outputting synchronous phase 622 can indicate at which bit the beginning of the sync pattern is located within parallel data 609.

Figure 12:
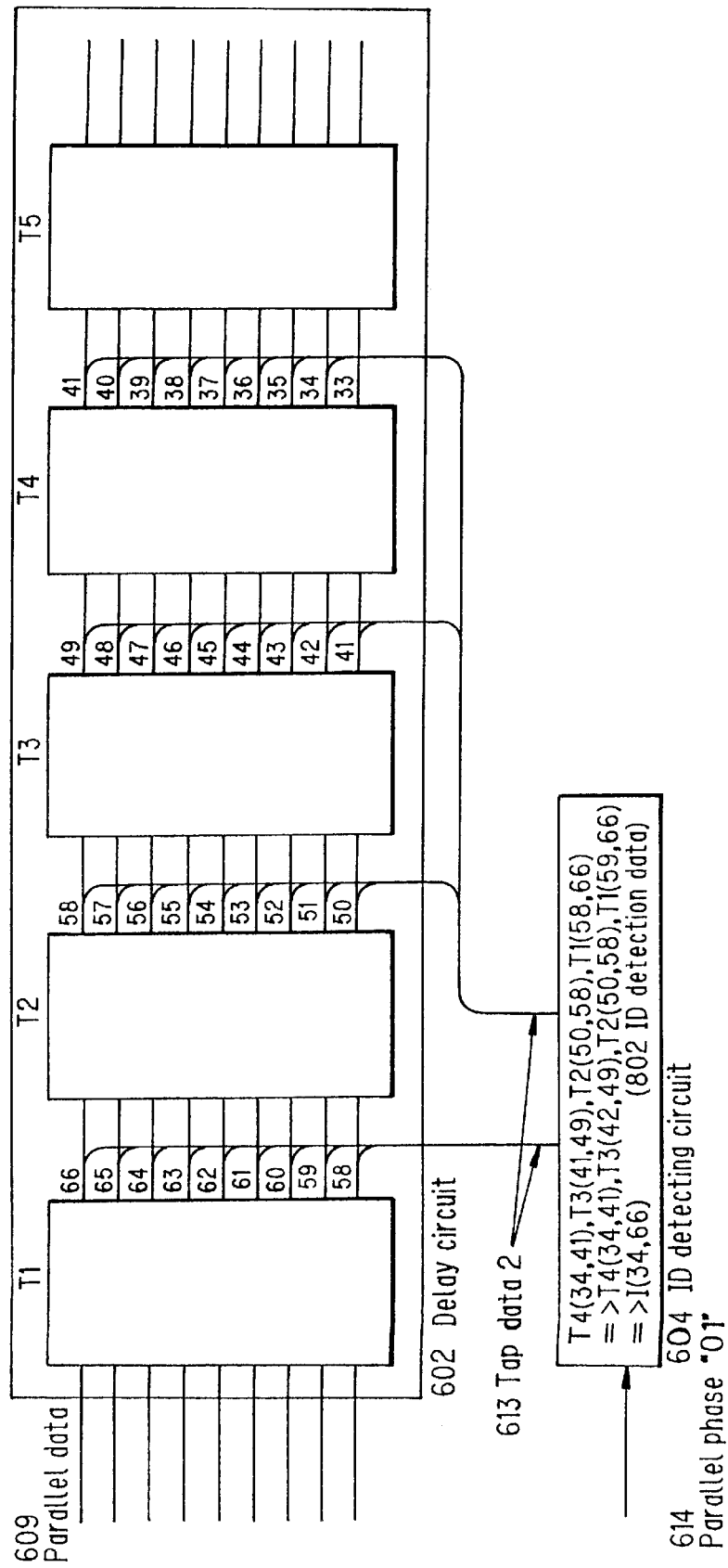
FIG. 12 is a detailed diagram showing a fourth example of the delay block portion in a synchronism detection and demodulating circuit of the invention.

As shown in FIGS. 10 to 12, ID detecting circuit 604 receives as tap data 2(613), 8 bits from the rear side of T4, 9 bits each for T3, T2 and T1, in total 35 bits, and deletes the redundant parallel data within tap data 2 using parallel phase 614. When parallel phase 614 is set at '10' as shown in FIG. 10, the final bit of T3 and the leading bit of T2 are redundant, the final bit of T2 and the leading bit of T1 also being redundant. When parallel phase 614 is set at '00' as shown in FIG. 11, the final bit of T4 and the leading bit of T3 are redundant, the final bit of T3 and the leading bit of T2 also being redundant. When parallel phase 614 is set at '01' as shown in FIG. 12, the final bit of T4 and the leading bit of T3 are redundant, the final bit of T2 and the leading bit of T1 also being redundant. One of each redundant pair of bits is deleted to construct ID detection data.

For example, in the case of FIG. 10 where parallel phase 614 is '10', ID detecting circuit 604 receives T4(17,24), T3(25,33), T2(33,41) and T1(41,49) as tap data 2(613). If the leading one of the redundant bits is deleted, tap data 2(613) will become T4(17,24), T3(25,33), T2(34,41) and T1(42,49), forming ID detection data 802, which will be represented by I(17,49).

In the case of FIG. 11 where parallel phase 614 is '11', ID detecting circuit 604 receives T4(26,33), T3(33,41), T2(41, 49) and T1(50,58) as tap data 2(613). After the leading one of the redundant bits is deleted, tap data 2(613) will become T4(26,33), T3(34,41), T2(42,49) and T1(50,58), thus producing ID detection data 802 represented by I(26,58).

In the case of FIG. 12 where parallel phase 614 is '01', ID detecting circuit 604 receives T4(34,41), T3(41,49), T2(50, 58) and T1(58,66) as tap data 2(613). After the leading one of the redundant bits is deleted, tap data 2(613) will become T4(34,41), T3(42,49), T2(50,58) and T1(59,66), thus producing ID detection data 802 represented by I(34,66).

As a result, whatever parallel phase 614 is, ID detection data 802 will be formed into a row of data with a 33 bit width from serially inputted data. In the above example, the leading one of the redundant bits was deleted, but the rear one of the redundant bits may alternatively be deleted. It is also possible to selectively delete either leading or rear one of the redundant bits, without any change of the function.

As shown in FIG. 6, ID detecting circuit 604, based on retained synchronous phase 623, detects ID and ID parity contained in the ID detection data 802 which is obtained while protective sync pattern detection pulse 615 is true. In the circuit of this embodiment, protective sync pattern detection pulse 615 will become true one clock unit after the sync pattern detection pulse 518 does. The reason why protective sync pattern detection pulse 615 will become true one clock unit after the sync pattern detection pulse 518 does, will be explained later in the part concerning the operation of sync block protecting circuit 605.

Accordingly, the ID and ID parity of the sync pattern which is detected during the period of FIG. 9 will be detected from ID detection data I(17,49) of FIG. 10; the ID and ID parity of the sync pattern which is detected during the period of FIG. 10 will be detected from ID detection data I(26,58) of FIG. 11; and the ID and ID parity of the sync pattern which is detected during the period of FIG. 11 will be detected from ID detection data I(34,66) of FIG. 12.

The positional relationship of the bits of ID and ID parity to the beginning of the sync pattern will be summarized. Assuming that x(n) represents the beginning of the sync pattern, the positions of bits of ID and ID parity are written as follows:

$$
\begin{aligned}
ID0(0) &= x(n + 15) \\
ID0(1) &= x(n + 16) \\
ID0(2) &= x(n + 17) \\
ID0(3) &= x(n + 18) \\
ID0(4) &= x(n + 19) \\
ID0(5) &= x(n + 20) \\
ID0(6) &= x(n + 21) \\
ID0(7) &= x(n + 22) \\
ID1(0) &= x(n + 24) \\
ID1(1) &= x(n + 25) \\
ID1(2) &= x(n + 26) \\
ID1(3) &= x(n + 27) \\
ID1(4) &= x(n + 28) \\
ID1(5) &= x(n + 29) \\
ID1(6) &= x(n + 30) \\
ID1(7) &= x(n + 31) \\
IDP(0) &= x(n + 32) \\
IDP(1) &= x(n + 33) \\
IDP(2) &= x(n + 34) \\
IDP(3) &= x(n + 35) \\
IDP(4) &= x(n + 36) \\
IDP(5) &= x(n + 37) \\
IDP(6) &= x(n + 38) \\
IDP(7) &= x(n + 39)
\end{aligned}
$$

The sync pattern which is detected during the period of FIG. 9 has its beginning at a position between x(3) and x(10), and the beginning of it can be identified based on retained synchronous phase 623 such as x(3) when retained synchronous phase 623 is '0000', x(10) when retained synchronous phase 623 is '0111' and the like. The ID and ID parity corresponding to the sync pattern as shown in FIG. 10 is detected from ID detection data I(17,49).

When the beginning of the sync pattern resides at x(3), 3 is substituted for n in the above expressions: ID0(0) can be determined as x(3+15), i.e., x(18). Similarly, IDP(7) can be determined as x(3+39), i.e., x(42). When the beginning of the sync pattern resides at x(10), 10 is substituted for n in FIG. 13: ID0(0) can be determined as x(10+15), i.e., x(25). Similarly, IDP(7) can be determined as x(10+39), i.e., x(49).

Accordingly, the ID and ID parity corresponding to the sync pattern which is detected during the period of FIG. 9 are all contained in ID detection data I(17,49) detected during the period of FIG. 10 and can be detected therefrom.

The sync pattern which is detected during the period of FIG. 10 has its beginning at a position between x(11) and x(18), and the beginning of it can be identified similarly to the period of FIG. 9, based on retained synchronous phase 623 such as x(11) when retained synchronous phase 623 is '0000', x(18) when retained synchronous phase 623 is '0111' and the like.

The ID and ID parity corresponding to this sync pattern are detected from ID detection data I(26,58) of FIG. 11. When the beginning of the sync pattern resides at x(11), 11 is substituted for n in the above expressions showing the positional relationship of the bits of ID and ID parity to the beginning of the sync pattern: ID0(0) can be determined as x(11+15), i.e., x(26). The similar rule applies correspondingly to the following: IDP(7) can be determined as x(11+39), i.e., x(50).

Figure 13:
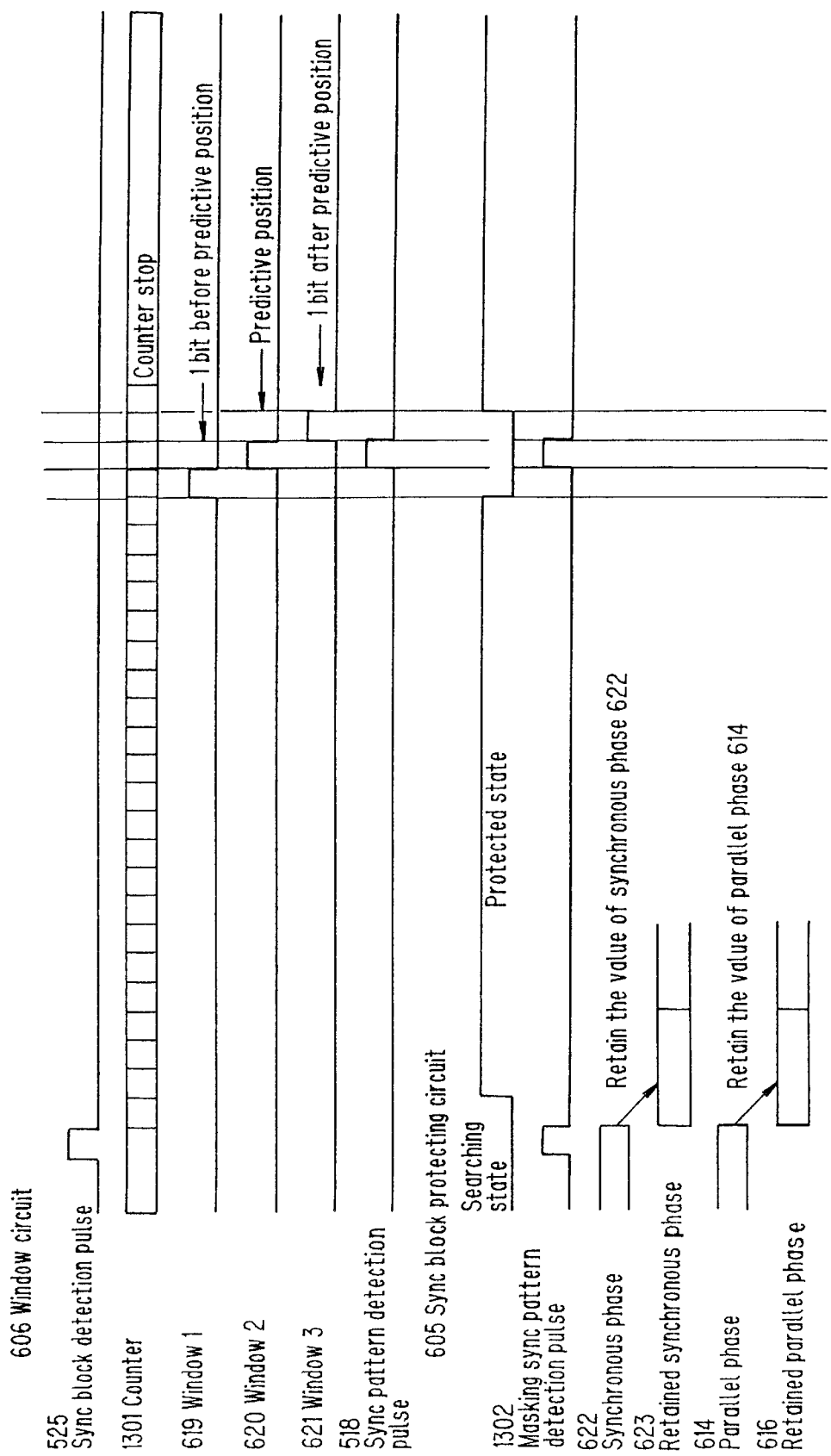
FIG. 13 is a timing chart in the window circuit portion and sync block protecting circuit of the invention.
Figures 1, 16A:
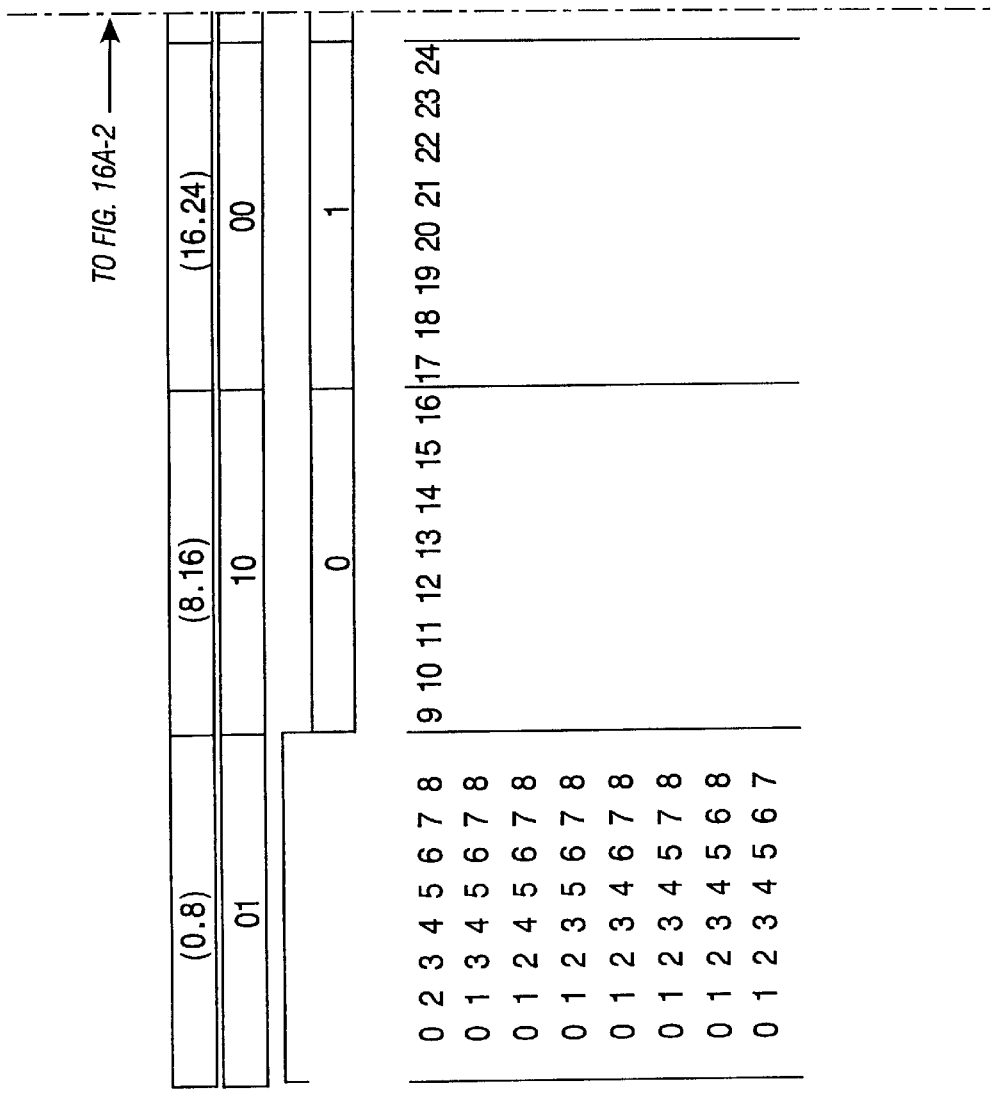
Figures 1, 16B:
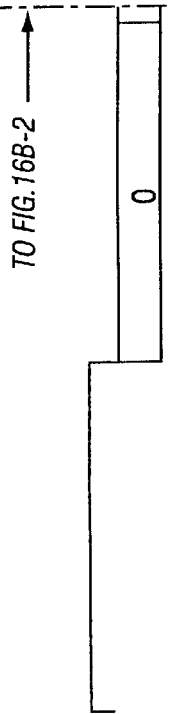

When the beginning of the sync pattern resides at x(18), 18 is substituted for n in FIG. 13: ID0(0) can be determined as x(18+15), i.e., x(33). The similar rule applies corresponding to the following: IDP(7) can be determined as x(18+39), i.e., x(57). Accordingly, the ID and ID parity corresponding to the sync pattern which is detected during the period of FIG. 10 are all contained in I(26,58) of ID detection data 802 detected during the period of FIG. 11 and can be detected therefrom.

The sync pattern which is detected during the period of FIG. 11 has its beginning at a position between x(19) and x(27), and the beginning of it can be identified similarly to the period of FIG. 10, based on retained synchronous phase 623 such as x(19) when retained synchronous phase 623 is '0000', x(27) when retained synchronous phase 623 is '1000' and the like.

The ID and ID parity corresponding to this sync pattern are detected from ID detection data I(34,66). When the beginning of the sync pattern resides at x(19), 19 is substituted for n in the above expressions showing the positional relationship of the bits of ID and ID parity to the beginning of the sync pattern: ID0(0) can be determined as x(19+15), i.e., x(34). The similar rule applies correspondingly to the following: IDP(7) can be determined as x(19+39), i.e., x(58).

When the beginning of the sync pattern resides at x(27), 27 is substituted for n in the above expressions showing the positional relationship of the bits of ID and ID parity to the beginning of the sync pattern: ID0(0) can be determined as x(27+15), i.e., x(42). The similar rule applies correspondingly to the following: IDP(7) can be determined as x(27+39), i.e., x(66). Accordingly, the ID and ID parity corresponding to the sync pattern which is detected during the period of FIG. 11 are all contained in ID detection data I(34,66) detected during the period of FIG. 12 and can be detected therefrom.

As a result, in the above cases of FIGS. 9, 10 and 11, or for a sync pattern which is detected in any case where parallel phase 614 is '01', '10' or '00', all the bits of the ID and ID parity corresponding to the case are contained in ID detection data. Thus, it becomes possible to obtain and detect proper positions of the bits of the ID and ID parity based on retained synchronous phase 623 indicating the beginning of the sync pattern detected.

Using the process stated above, ID detecting circuit 604 can properly detect the ID and ID parity corresponding to a sync pattern wherever the sync pattern is located within parallel data 609, and checks errors based on the detected ID and ID parity so as to output ID error flag 520 which will become true when there is an error and output the detected ID 521.

As shown in FIG. 13, when sync block detection pulse 525 becomes true, window circuit 606 determines the length of the sync block which is currently detected, based on the block number showing the order of the blocks within protection ID 526. Then, a value in accordance with the determined length of the sync block is loaded into a counter 1301 for predicting the position where the next sync pattern will be detected. In response to this operation, window circuit 606 outputs three windows: a first window 1(619) which will become true when counter 1301 reaches the value corresponding to the position one clock unit before the predicted position where the next sync pattern detection pulse 518 will become true; a second window 2(620) which will become true when counter 1301 reaches the value corresponding to the predicted position where the next sync pattern detection pulse 518 will become true; and a third window 3(621) which will become true when counter 1301 reaches the value corresponding to the position one clock unit after the predicted position where the next sync pattern detection pulse 518 will become true.

Then counter 1301 pauses from when window 3(621) changes from 'true' to 'false' until sync block detection pulse 525 becomes true again.

When the window width is set to be one clock unit, the data is judged to be a sync block only when the position, where sync pattern detection pulse 518 becomes true, does not deviate even one clock unit of regenerative clock 513 from the predicted position of the sync pattern which was determined based on the length of the previous sync block. In this situation the following two conditions are checked: a first condition that window 2(620) is true while sync pattern detection pulse 518 is true; and a second condition that synchronous phase 622 corresponds to retained synchronous phase 523. Only when these two conditions are satisfied, it is determined that a sync pattern was detected within the predicted range.

When the window width is set to be three clock units, the data is judged to be a sync block even when the position where sync pattern detection pulse 518 becomes true deviates one clock unit of regenerative clock 513 before or behind from the predicted position of the sync pattern which was determined based on the length of the previous sync block. In this condition, there are cases in which it can be determined that a sync pattern was detected within the predicted range even when the first condition is not satisfied as long as retained synchronous phase 623 is '0000', '1000' or '0111', as will be explained below.

In the case where retained synchronous phase 623 is '0000', if the position of the sync pattern determined based on the length of the previous sync block deviates one clock unit of regenerative clock 513 before the predicted position, synchronous pattern detection pulse 518 becomes true one clock unit of parallel clock 610 before, or during the period where window 1(619) is true.

In contrast, in the case where retained synchronous phase 623 is '1000', if the position of the sync pattern determined based on the length of the previous sync block deviates one clock unit of regenerative clock 513 behind the predicted position, synchronous pattern detection pulse 518 becomes true one clock unit of parallel clock 610 after, or during the period where window 3(621) is true.

Also in the case where retained synchronous phase 623 is '0111' and retained parallel phase 616 is '01' or '10', if the position of the sync pattern which is determined based on the length of the pervious sync block deviates one clock unit of regenerative clock 513 after the predicted position, sync pattern detection pulse 518 becomes true one clock unit of parallel clock 610 after, or during the period where window 3(621) is true.

In cases other than the above, even when the position of the sync pattern which is determined based on the length of the pervious sync block deviates one clock unit of regenerative clock 513 before or behind, there are cases in which it can be determined that a sync pattern was detected. Such a case may occur when sync pattern detection pulse 518 becomes true during the period where window 2(620) is true and even when the second condition where the window width is assumed to be one clock unit, is not satisfied.

Specifically, for the combinations of retained parallel phase 616 and retained synchronous phase 623 in FIG. 18, it is determined that a sync pattern was detected when the data matched any one of the conditions in the three different columns on the same row, i.e., 1 clock unit before, the predicted position, and 1 clock unit behind.

Similarly, if the window width is needed to be five clock units, for the combinations of retained parallel phase 616 and retained synchronous phase 623, it is determined that a sync pattern was detected when the data matched any one of the conditions in the five different columns on the same row, i.e., 2 clock units before, 1 clock unit before, the predicted position, 1 clock unit behind, and 2 clock units behind.

It is possible to broaden the window width to 17 clocks by a similar manner as above. Moreover, when extra windows are added before window 1(619) or behind window 3(621), it is possible to broaden the window width further more.

As shown in FIG. 14, sync block protecting circuit 605 performs a NOR operation of masking sync pattern detection pulse 1302, 1 bit delayed pulse 1401 of the masking sync pattern detection pulse and 2 bit delayed pulse 1402 of the masking sync pattern detection pulse to produce a predictive synchronism masking signal 1403. Circuit 605 further performs an AND operation of predictive synchronism masking signal 1403 and window 3(621) to produce a predictive synchronism signal 1404. Circuit 605, then performs an OR operation of predictive synchronism signal 1404 and 1 clock unit delayed signal of masking sync pattern detection pulse 1302 to produce protective sync pattern detection pulse 615.

Using the process stated above, as long as sync pattern detection pulse 518 becomes true even if masking sync pattern detection pulse 1302 is not true in the synchronism protected state, protective sync pattern detection pulse 615 that becomes true one clock after the predicted position is produced. Moreover, if masking sync pattern detection pulse 1302 is true, predictive synchronism signal 1404 is masked so that protective sync pattern detection pulse 615 becomes true one clock unit after masking sync pattern detection pulse 1302 becomes true.

As shown in FIG. 15, sync block protecting circuit 605 retains ID 521 while protective sync pattern detection pulse 615 is true, to thereby generate a retained ID 1501, and retains ID 521 only when ID error flag 520 is false while protective sync pattern detection pulse 615 is true. When ID error flag 520 is true, circuit 605 produces a predicted ID 1502 which was predictive for the present ID on the basis of the ID 521 retained when ID error flag 520 was false, to thereby output an ID prediction error 1503 which will become true when retained ID 1501 and predictive ID 1502 do not coincide to each other.

While protective sync pattern detection pulse 615 is true, sync block protecting circuit 605 retains the inverse of a signal which is formed by delaying a masking sync pattern detection pulse 1302 by one clock unit to thereby produce a sync pattern error 1504. Circuit 605 also retains ID error flag 520 while protective sync pattern detection pulse 615 is true to thereby produce an ID parity error 1505. If ID prediction error 1503, sync pattern error 1504 and ID parity error 1505 are successively true, the situation of the errors are observed by counting the number of successions of the errors or checking other factors, to thereby set a synchronism ID error flag 1506 which determines whether the synchronism protected state should be maintained or not.

Synchronism ID error flag 1506 will become true when the sync synchronism protected state should be disengaged. Based on this synchronism ID error flag 1506, synchronism establishment flag 527 is determined to be true or not. Only when synchronism establishment flag 527 is true, sync block detection pulse 525 which becomes true four clock units behind protective sync pattern detection pulse 615 is outputted.

Sync block protecting circuit 605 outputs as protection ID 1501, retained ID 1501 when ID prediction error 1503 and ID parity error 1505 are both false, and otherwise outputs predictive ID 1502.

Sync block protecting circuit 605 outputs a signal which indicates in which position the extra bit is present within tap data 3(611), namely intra-block phase 617 which is the output from a 3-cycle counter that is reset at 0 when the masking sync pattern detection pulse becomes true, and then counts up one by one and is reset when the count reaches 2.

In this embodiment, an example of the method for generating protective sync pattern detection pulse 615, sync block detection pulse 525 and protection ID 1501 with relation to the synchronism protection in sync block protecting circuit 605 was described, but the above method is not directly related to the present invention, therefore any other methods can be used to protect synchronism.

Supplied with 9 bits of T5 as tap data 3(611), barrel shifter 607 deletes the extra bit and the redundant parallel data within tap data 3(611) on the basis of retained synchronous phase 623, retained parallel phase 616 and intra-block phase 617, rearranging the data to be lined up for each word as a unit.

Where the extra bit existing 2 bits before the beginning of the sync pattern is located within the shift register of 9 bit width in delay circuit 502 when masking sync pattern detection pulse 1302 becomes true, will be summarized.

In the case of FIG. 9 where parallel phase 614 is '01' and synchronous phase 622 is '0000', the beginning of the sync pattern resides at the leading bit of synchronism detection data 801, or at the third bit of T5, therefore the extra bit resides two bits before it or at the first bit of T5. Similarly, the positions of the extra bit in the other cases depending on the parallel phase and the sync phases are shown as follows:

| Synchronous phase | Parallel phase | |
|---|---|---|
| | '01', '10' | '00' |
| '0000' | T5(1) | T5(1) |
| '0001' | T5(2) | T5(2) |
| '0010' | T5(3) | T5(3) |
| '0011' | T5(4) | T5(4) |
| '0100' | T5(5) | T5(5) |
| '0101' | T5(6) | T5(6) |
| '0110' | T5(7) | T5(7) |
| '0111' | T5(8), T4(0) | T5(8) |
| '1000' | | T4(0) |

Accordingly, suppose that tap data 3(611) is made up of 9 bits of T5. In this case, if synchronous phase 622 takes a value from '0000' to '0111' when masking sync pattern detection pulse 1302 becomes true, the extra bit resides within the tap data 3(611) at that moment. Of these cases, when synchronous phase 622 is '0111' and parallel phase 614 is '01' or '10', the extra bit redundantly parallel appears at the leading bit of the tap data 3(611) during the next clock period. When synchronous phase 622 is '1000', the extra bit turns out to be present at the leading bit of the tap data 3(611) during the next clock period.

In this connection, intra-block phase 617 is a signal which is reset at 0 when masking sync pattern detection pulse 1302 becomes true and changes from 0 to 2 cyclically during the period of 3 clock units. Therefore, extra bits appear periodically every 3 clock units at the same bit position within tap data 3(611).

Where in the clock position of tap data 3(611) an extra bit appears, will be determined by using intra-block phase 617. Intra-block phase 617 is reset when masking sync pattern detection pulse 1302 becomes true.

Extra bits appear periodically every 3 clock units at the same bit position within tap data 3(611). When intra-block phase 617 is 2, the clock position where the extra bit appears corresponds to the position when masking sync pattern detection pulse 1302 is made true using intra-block phase 1607.

First, the bit position of the extra bit within parallel data 609 will be determined using retained synchronous phase 623. When retained synchronous phase 623 is '0000', it is indicated that the leading bit of synchronism detection data 801 resides at the beginning of the sync pattern, and it turns out that the beginning of the sync pattern resides at the third bit of parallel data 609.

Since the extra bit is known to be located two bits before the beginning of the sync pattern, the extra bit obviously resides at the first bit of parallel data 609. When retained sync phase 623 is '0001', it is indicated that the leading bit of synchronism detection data 801 resides at the beginning of the sync pattern, and the beginning of the sync pattern is known to reside at the fourth bit of parallel data 609. Accordingly, the extra bit is obviously located at the second bit of parallel data 609. Similarly, the positional relationship between retained synchronous phase 623 and the extra bit in parallel data 609 can be summarized as follows:

| Retained synchronous phase | Position of the extra bit |
| --- | --- |
| '0000' | 1st bit |
| '0001' | 2nd bit |
| '0010' | 3rd bit |
| '0011' | 4th bit |
| '0100' | 5th bit |
| '0101' | 6th bit |
| '0110' | 7th bit |
| '0111' | final bit |
| '1000' | leading bit |

It should be noted that when retained synchronous phase 623 is '1000', the extra bit is located at the leading bit within the parallel data 609 which delays one clock unit from the parallel data in which the extra bit in the other cases reside. Since tap data 3(611) is the data which is obtained by merely shifting the parallel data 609, extra bits appear every 3 clock units at the same position as in parallel data 609.

First, the deleting method of redundant data in the parallel data will be summarized. As already described in the explanation concerning the operation of serial-to-parallel converter circuit 601, the redundant data arranged in parallel has the following features: parallel data 609 at the time when parallel phase 614 is '10', has redundant data arranged in parallel, at its final bit; parallel data 609 at the time when parallel phase 614 is '00', has redundant data arranged in parallel, at its leading and final bits; and parallel data 609 at the time when parallel phase 614 is '01', has redundant data arranged in parallel, at its leading bit.

As shown in FIG. 9 and FIGS. 16A1–16A2, when parallel phase 614 is '01' and synchronous phase 622 is '0000', the leading bit of synchronism exists at x(3) in T5. Since the extra bit is known to exist two bits before the leading bit of synchronism, x(1) of T5 is selected to be deleted in this condition. When parallel phase 614 is '01' and synchronous phase 622 is '0001', the leading bit of synchronism exists at x(4) in T5. Since the extra bit is known to exist two bits before the leading bit of synchronism, x(2) of T5 is selected to be deleted in this condition.

As in a similar manner, when parallel phase 614 is '01' and synchronous phase 622 takes a value from '0010' to '0111', x(3) to x(8) of T5, which exists two bits before the corresponding leading bit of synchronism, is selected to be deleted. In this way, 8 bits are selected from 9 bits of T5.

Since the leading bit in the data existing in T4 is redundant due to the fact that parallel phase 614 is '01', 8 bits from the second to the ninth bit are selected when this data comes to T5 after one clock unit. Similarly, since the leading bit in the data existing in T3 is redundant because of the fact that parallel phase 614 is '01', 8 bits from the second to the ninth bit are selected when this data comes to T5 after two clock units.

As shown in FIG. 10 and FIGS. 16B1–16B2, when parallel phase 614 is '10' and synchronous phase 622 is '0000', the leading bit of synchronism exists at x(11) in T5. Since the extra bit is known to exist two bits before the leading bit of synchronism, x(9) of T5 is selected to be deleted in this condition. When parallel phase 614 is '10' and synchronous phase 622 is '0001', the leading bit of synchronism exists at x(12) in T5.

Since the extra bit is known to exist two bits before the leading bit of synchronism, x(10) of T5 is selected to be deleted in this condition. Similarly, when parallel phase 614 is '10' and synchronous phase 622 takes a value from '0010' to '0111', x(11) to x(16) of T5, which exists two bits before the corresponding leading bit of synchronism, is selected to be deleted. In this way, 8 bits are selected from 9 bits of T5.

Since the leading bit in the data existing in T4 is redundant due to the fact that parallel phase 614 is '10', 8 bits from the second to the ninth bit are selected when this data comes to T5 after one clock unit. Similarly, since the final bit in the data existing in T3 is redundant because of the fact that parallel phase 614 is '10', 8 bits from the first to the eighth bit are selected when this data comes to T5 after two clock units.

As shown in FIG. 11 and FIGS. 16C1–16C2, when parallel phase 614 is '00' and synchronous phase 622 is '0000', the leading bit of synchronism exists at x(19) in T5. Since the extra bit is known to exist two bits before the leading bit of synchronism, x(17) of T5 is selected to be deleted in this condition. When parallel phase 614 is '00' and synchronous phase 622 is '0001', the leading bit of synchronism exists at x(20) in T5. Since the extra bit is known to exist two bits before the leading bit of synchronism, x(18) of T5 is selected to be deleted in this condition. Similarly, when parallel phase 614 is '00' and synchronous phase 622 takes a value from '0010' to '0111', x(19) to x(24) of T5, which exists two bits before the corresponding leading bit of synchronism, is selected to be deleted. In this way, 8 bits are selected from 9 bits of T5.

Since the leading bit in the data existing in T4 is redundant due to the fact that parallel phase 614 is '00', 8 bits from the second to the ninth bit are selected when this data comes to T5 after one clock unit. Similarly, since the final bit in the data existing in T3 is redundant because of the fact that parallel phase 614 is '00', 8 bits from the first to the eighth bit are selected when this data comes to T5 after two clock units.

When the parallel phase is '00', the period where synchronous phase 622 is '1000' as stated above. In this case, the leading bit of synchronism exits at the third bit of T4. Since the extra bit is known to exist two bits before the leading bit of synchronism, x(1) of T4 is selected to be deleted in this condition. Since the data existing in T3 or T2 has redundant reading bit, the second bit is deleted for each.

Similarly to the case of synchronism detection data 801, it should be noted that in the above example, a circuit configuration in which one of the redundant bits is deleted was explained, but another circuit configuration in which the other side of redundant bits is deleted may alternatively be used without nay change of the function.

In the above description, the elimination of the extra bits and the redundant bits was discussed. Now, the rearrangement of the data which need be effected in the next step (in the same barrel shifter 607) will be described.

As shown in FIG. 17, 8 bit data which was obtained from T5 by deleting one bit using a selector 1 (1701) is one-latched in a latch circuit 1702 to produce 7 bits of data (the seventh bit is taken away from the output from selector 1). These 7 bits of data and the 8 bits of the direct output from selector 1 (1701) are inputted to a selector 2 (1703), where the leading bit of synchronism is determined with reference to synchronous phase 622 so that the order of the data is rearranged with the thus determined leading bit set at the beginning, to output them at intervals of 8 bits. This data forms lined-up data 618.

Descrambling circuit 509 performs the MOD2 addition of lined-up data 618 to the same M-series random signal at recording, outputting descrambled data 530, which in turn is sent to protection ID adding circuit 608. The modified ID is inserted into the beginning of descrambled data 530 by protection ID adding circuit 608, thereby producing demodulated data 531, which is sent to code error correcting section 511.

In accordance with the invention, without necessity for a special memory for converting the width of data, it is possible to directly pick up the required data from the register.

Since the circuit can be essentially operated based on a single kind of clock having a 8 bit cycle, it is possible to simplify the configuration of the clock circuit.

What is claimed is:

1. A synchronism detection and demodulating circuit for performing synchronism detection and demodulation of a reproduced data stream which was recorded based on a modulating scheme whereby a digital data stream consisting of n-bit words is divided every m words and these are grouped as a unit, each group being added with extra 'p' bits ('p' is not an integer multiple of 'm'), to produce one block of {(n>m)+p} bits, comprising:

a first circuit which shapes serially inputted regenerative data into a parallel form using an irregularly frequency-divided clock signal which is frequency divided by m/((n×m )+p);

a second circuit which detects sync patterns from the data in the parallel form from the first circuit whilst deleting a redundant part in the parallel data;

a third circuit which detects ID information from the data in the parallel form from the first circuit whilst deleting the redundant part in the parallel data;

a fourth circuit which effects synchronism protection based on the information from the second and third circuits; and a fifth circuit which rearranges the data in the parallel form from the first circuit, based on the information from the fourth circuit whilst deleting the extra bits and redundant part in the parallel data.

2. A synchronism detection and demodulating circuit according to claim 1, wherein the first circuit produces a signal for deleting the redundant part in the parallel data.

3. A synchronism detection and demodulating circuit according to claim 2, wherein 'n', 'm' and 'p' are set at 8, 3 and 1, respectively.

4. A synchronism detection and demodulating circuit, according to claim 1, wherein the second circuit, whilst detecting sync patterns, deletes the redundant part in the parallel data, using a signal obtained from the first circuit for deleting the redundant part in the parallel data, and produces a signal for identifying the position of a sync pattern in the parallel data whilst taking into account the presence of the reduction part in the parallel data.

5. A synchronism detection and demodulating circuit according to claim 4, wherein 'n', 'm' and 'p' are set at 8, 3 and 1, respectively.

6. A synchronism detection and demodulating circuit, according to claim 1, wherein the third circuit deletes the redundant part of the parallel data, using a signal obtained from the first circuit for deleting the parallel data redundantly formed, whilst detecting ID information in the parallel data using a signal obtained from the parallel data for identifying the position of a sync pattern from the second circuit.

7. A synchronism detection and demodulating circuit according to claim 6, wherein 'n', 'm' and 'p' are set at 8, 3 and 1, respectively.

8. A synchronism detection and demodulating circuit, according to claim 1, wherein the fourth circuit produces a signal for indicating positions of extra bits in the parallel data, whilst performing synchronism protection.

9. A synchronism detection and demodulating circuit according to claim 8, wherein 'n', 'm' and 'p' are set at 8, 3 and 1, respectively.

10. A synchronism detection and demodulating circuit, according to claim 1, wherein the fifth circuit rearranges the data, based on a signal generated in the first circuit for deleting the redundant part of the parallel data, a signal generated in the second circuit for identifying the position of a sync pattern in the parallel data and a signal generated in the fourth circuit for indicating positions of extra bits in the parallel data, whilst performing synchronism protection.

11. A synchronism detection and demodulating circuit according to claim 10, wherein 'n', 'm' and 'p' are set at 8, 3 and 1, respectively.

12. A synchronism detection and demodulating circuit according to claim 1, wherein 'n', 'm' and 'p' are set at 8, 3 and 1, respectively.

13. A synchronization and demodulating circuit for performing synchronism detection and demodulation of a reproduced data stream which was recorded based on a modulating scheme whereby a digital data stream consisting of n-bit words is divided every m words and these are grouped as a unit, each group being added with extra 'p' bits ('p' is not an integer multiple of 'm'), to produce one block of {(n×m+p} bits, comprising:

a synchronization pattern detecting circuit for detecting synchronization patterns and deleting a redundant part in parallel data derived from a serial to parallel converter which uses an irregularly frequency-divided clock signal which is frequency divided by m/((n×m)+p);

an ID detecting circuit for detecting ID information from the parallel data; and a synchronism protection circuit for effecting synchronism protection based on information from the synchronization pattern detecting circuit and the ID detecting circuit.

* * * * *